US009959707B2

(12) United States Patent
Arnone et al.

(10) Patent No.: US 9,959,707 B2
(45) Date of Patent: May 1, 2018

(54) PASSIVELY TRIGGERED WAGERING SYSTEM

(71) Applicant: Gamblit Gaming, LLC, Glendale, CA (US)

(72) Inventors: Miles Arnone, Sherborn, MA (US); Eric Meyerhofer, Pasadena, CA (US); Frank Cire, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days. days.

(21) Appl. No.: 15/336,696

(22) Filed: Oct. 27, 2016

(65) Prior Publication Data

US 2017/0046920 A1 Feb. 16, 2017

Related U.S. Application Data

(63) Continuation of application No. 14/825,056, filed on Aug. 12, 2015, now Pat. No. 9,495,837, which is a (Continued)

(51) Int. Cl.
*G06F 17/00* (2006.01)
*G07F 17/32* (2006.01)

(52) U.S. Cl.
CPC ........ *G07F 17/3258* (2013.01); *G07F 17/326* (2013.01); *G07F 17/3211* (2013.01); (Continued)

(58) Field of Classification Search
USPC ...................................................... 463/16–25
See application file for complete search history.

(56) References Cited

U.S. PATENT DOCUMENTS 5,413,357 A 5/1995 Schulze et al.
5,718,429 A 2/1998 Keller
(Continued)

FOREIGN PATENT DOCUMENTS

WO 2013009972 A1 1/2013
WO 2013010036 A1 1/2013

OTHER PUBLICATIONS

U.S. Appl. No. 14/185,847 Arnone, et al., filed Feb. 20, 2014.
(Continued)

*Primary Examiner* — Ronald Laneau
(74) *Attorney, Agent, or Firm* — Caitlyn Ross

(57) ABSTRACT

An electronic gaming machine that provides passively triggered wagering is disclosed. In an entertainment game, passively actuated enabling elements are provided. Passively actuated enabling elements are enabling elements that are consumed through game play of the entertainment game but not directly through player action by a player. An entertainment system engine of the gambling hybrid game provides the entertainment game and determines when a passively actuated enabling element is consumed in the game. A game world controller of the gambling hybrid game determines when a gambling event in a gambling game is to be provided based upon the consumption of the passively actuated enabling element. The game world controller then requests that a real world engine of the gambling hybrid game resolve the gambling event in the gambling game. The real world engine then resolves the gambling event and associated wagers on the outcome of the gambling event.

18 Claims, 15 Drawing Sheets

Related U.S. Application Data continuation of application No. PCT/US2014/015894, filed on Feb. 11, 2014.

(60) Provisional application No. 61/763,684, filed on Feb. 12, 2013.

(52) U.S. Cl.
CPC ...... *G07F 17/3225* (2013.01); *G07F 17/3267* (2013.01); *G07F 17/3276* (2013.01); *G07F 17/3286* (2013.01)

(56) References Cited

U.S. PATENT DOCUMENTS

| | | | |
|---|---|---|---|
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,874,908 | B2 | 1/2011 | Walker |
| 7,917,371 | B2 | 3/2011 | Jung et al. |
| 7,931,531 | B2 | 4/2011 | Oberberger |
| 7,938,727 | B1 | 5/2011 | Konkle |
| 7,950,993 | B2 | 5/2011 | Oberberger |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,388,831 | B2 | 3/2013 | Cleminson |
| 8,430,735 | B2 | 4/2013 | Oberberger |
| 8,475,266 | B2 | 7/2013 | Arnone |
| 8,480,470 | B2 | 7/2013 | Napolitano et al. |
| 8,622,809 | B1 | 1/2014 | Arora et al. |
| 8,864,564 | B2 | 10/2014 | Oberberger |
| 2001/0004609 | A1 | 6/2001 | Walker et al. |
| 2001/0019965 | A1 | 9/2001 | Ochi |
| 2002/0022509 | A1 | 2/2002 | Nicastro et al. |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0097610 | A1 | 5/2004 | Kashiwame |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |

(56) References Cited

U.S. PATENT DOCUMENTS

| | | | |
|---|---|---|---|
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |
| 2009/0239610 | A1 | 9/2009 | Olive |
| 2009/0247272 | A1 | 10/2009 | Abe |
| 2009/0270164 | A1 | 10/2009 | Seelig |
| 2009/0275393 | A1 | 11/2009 | Kisenwether |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis |
| 2010/0004058 | A1 | 1/2010 | Acres |
| 2010/0016056 | A1 | 1/2010 | Thomas et al. |
| 2010/0029373 | A1 | 2/2010 | Graham et al. |
| 2010/0035674 | A1 | 2/2010 | Slomiany |
| 2010/0056247 | A1 | 3/2010 | Nicely |
| 2010/0056260 | A1 | 3/2010 | Fujimoto |
| 2010/0062836 | A1 | 3/2010 | Young |
| 2010/0093420 | A1 | 4/2010 | Wright |
| 2010/0093444 | A1 | 4/2010 | Biggar et al. |
| 2010/0105454 | A1 | 4/2010 | Weber |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0184509 | A1 | 7/2010 | Sylla et al. |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0285869 | A1 | 11/2010 | Walker |
| 2010/0304825 | A1 | 12/2010 | Davis |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gerson |
| 2011/0045896 | A1 | 2/2011 | Sak et al. |
| 2011/0070945 | A1 | 3/2011 | Walker |
| 2011/0077087 | A1 | 3/2011 | Walker et al. |
| 2011/0082571 | A1 | 4/2011 | Murdock et al. |
| 2011/0105206 | A1 | 5/2011 | Rowe et al. |
| 2011/0107239 | A1 | 5/2011 | Adoni |
| 2011/0109454 | A1 | 5/2011 | McSheffrey |
| 2011/0111820 | A1 | 5/2011 | Filipour |
| 2011/0111837 | A1 | 5/2011 | Gagner |
| 2011/0111841 | A1 | 5/2011 | Tessmer |
| 2011/0118011 | A1 | 5/2011 | Filipour et al. |
| 2011/0201413 | A1 | 8/2011 | Oberberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0230267 | A1 | 9/2011 | Van Luchene |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2011/0319169 | A1 | 12/2011 | Lam |
| 2012/0004747 | A1 | 1/2012 | Kelly |
| 2012/0028718 | A1 | 2/2012 | Barclay et al. |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0135793 | A1 | 5/2012 | Antonopoulos |
| 2012/0202587 | A1 | 8/2012 | Allen |
| 2012/0302311 | A1 | 11/2012 | Luciano |
| 2012/0322545 | A1* | 12/2012 | Arnone ............... G07F 17/3272 463/25 |
| 2013/0029760 | A1 | 1/2013 | Wickett |
| 2013/0131848 | A1 | 5/2013 | Arnone et al. |
| 2013/0190074 | A1 | 7/2013 | Arnone et al. |
| 2013/0260869 | A1 | 10/2013 | Basallo et al. |
| 2014/0087801 | A1 | 3/2014 | Nicely et al. |
| 2014/0087808 | A1 | 3/2014 | Basallo et al. |
| 2014/0087809 | A1 | 3/2014 | Leupp et al. |
| 2014/0357350 | A1 | 12/2014 | Weingardt et al. |
| 2016/0171827 | A1* | 6/2016 | Washington ........ G07F 17/3227 463/22 |
| 2016/0171835 | A1* | 6/2016 | Washington ........ G07F 17/3244 463/25 |

OTHER PUBLICATIONS

U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.

(56) References Cited

OTHER PUBLICATIONS

U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
WIPO/IPEA International Preliminary Report on Patentability, PCT/US14/15894, dated Aug. 15, 2014.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.

(56) References Cited

OTHER PUBLICATIONS

U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016.
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.
U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.
U.S. Appl. No. 15/060,502 Arnone, et al. filed Mar. 3, 2016.
WIPO/ISA—International Search Report and Written Opinion, PCT/US2014/015894, dated Aug. 15, 2014.

* cited by examiner

PASSIVELY TRIGGERED WAGERING SYSTEM

CROSS-REFERENCE TO RELATED APPLICATIONS

The current application is a continuation of U.S. patent application Ser. No. 14/825,056, filed Aug. 12, 2015, which is a continuation of Patent Cooperation Treaty Application No. PCT/US14/15894, filed Feb. 11, 2014, which claims the benefit of U.S. Provisional Application No. 61/763,684, filed Feb. 12, 2013, the disclosures of which are incorporated by reference herein as if set forth herewith. This application references Patent Cooperation Treaty Application Nos. PCT/US12/58156, filed Sep. 29, 2012, PCT/US11/26768, filed Mar. 1, 2011, PCT/US11/63587, filed Dec. 6, 2011, and PCT/US12/50204 filed Aug. 9, 2012, each disclosure of which is hereby incorporated by reference in its entirety.

FIELD OF THE INVENTION

Embodiments of the present invention are generally related to gaming and more specifically to systems and processes that provide a gambling hybrid game in which gambling events in the gambling game are triggered by passive game events during play of an entertainment game.

BACKGROUND OF THE INVENTION

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based game.

SUMMARY OF THE INVENTION

The disclosed embodiments relate generally to an interactive entertainment game where skill and chance may coalesce to provide a rich arcade-style gaming experience, visually exciting and challenging, where players may wager cash, credits prizes and points in order to win more of the foregoing. Many of the embodiments of the design provide an enticing method of gaming to the players who expect a high level of entertainment content in their gaming experience compared to the relatively simple game methods in use today.

Systems in accordance with embodiments of this invention provide a passively triggered wagering system including a processing device constructed to execute an entertainment game, where the entertainment game includes a passively actuated enabling element and the passively actuated enabling element is an enabling element that is consumed through game play of the entertainment game in a manner that is not directly responsive to a player action. The processing device is further constructed to determine when the passively actuated enabling element is consumed in the entertainment game, determine when a gambling event is triggered based on the player's actions in the entertainment game, transmit, to a game world controller, a signal indicating that the passively actuated enabling element has been consumed, transmit, to the game world controller, a signal including a trigger of the gambling event based on the player's actions in the entertainment game, receive, from the game world controller, a signal including a result of the gambling event based on consumption of the passively actuated enabling element, receive, from the game world controller, a signal including a result of the gambling event based on the player's actions in the entertainment game, display the result of the gambling event based on consumption of the passively actuated enabling element, and display the result of the gambling event based on the player's actions in the entertainment game. The passively triggered wagering system further includes a real world server constructed to receive, from the game world controller, a signal including a request for a resolution of the gambling event based on consumption of the passively actuated enabling element, receive, from the game world controller, a signal including a request for a resolution of the gambling event based on the player's actions in the entertainment game, determine the result of the gambling event based on consumption of the passively actuated enabling element, determine the result of the gambling event based on the player's actions in the entertainment game, transmit, to the game world controller, a signal including a result of the gambling event based on consumption of the passively actuated enabling element, and transmit, to the game world controller, a signal indicating a result of the gambling event based on the player's actions in the entertainment game. The passively triggered wagering system further includes the game world controller, connected to the processing device and connected to the real world server via a communication link, constructed to continuously monitor the processing device to determine if at least one passively actuated enabling element is available, determine that a player account includes a sufficient amount of real world credit for a wager associated with the passively actuated enabling element when the passively actuated enabling element is introduced into the entertainment game, automatically reserve the sufficient amount of real world credit in the player account for use on the wager when it is determined that the passively actuated enabling element is available, continuously monitor the processing device for the signal indicating that the passively actuated enabling element has been consumed, and continuously monitor the processing device for the signal including the trigger of the gambling event based on the player's actions in the entertainment game. The game world controller is further constructed to receive, from the processing device, the signal indicating that the passively actuated enabling element has been consumed, receive, from the processing device, the signal including the trigger of the gambling event based on the player's actions in the entertainment game, determine whether to trigger the gambling event based on the signal indicating that the passively actuated enabling element has been consumed, determine whether to trigger the gambling event based on the signal including the trigger of the gambling event based on the player's actions in the entertainment game, transmit, to the real world server, the signal including the request for the resolution of the gambling event based on consumption of the passively actuated enabling element, and transmit, to the real world server, the signal including the request for the resolution of the gambling event based on the player's actions in the entertainment game. The game world controller is further constructed to receive, from the real world server, the signal including the result of the gambling event based on consumption of the passively actuated enabling element, receive, from the real world server, the signal including the result of the gambling event based on the player's actions in the entertainment game, transmit, to the processing device, the signal including the result of the gambling event based on consumption of the passively actuated enabling element, and transmit, to the processing device, the signal including the result of the gambling event based on the player's actions in the entertainment game.

In accordance with many embodiments, the game world controller is further constructed to automatically determine an amount of quanta to award a player based on the result of the gambling event where quanta is a currency exchanged to change an entertainment game characteristic.

In accordance with numerous embodiments, the game world controller is further constructed to automatically determine an amount of quanta to award based on the result of the gambling event as well as the result of the consumption of the passively actuated enabling element in the entertainment game.

In accordance with various embodiments, the game world controller is further constructed to provide the passively actuated enabling element that may be introduced into the entertainment game using quanta, receive, from the processing device, the request from a player to introduce the passively actuated enabling element into the entertainment game, deduct an amount of the quanta required to introduce the passively actuated enabling element into the entertainment game from the amount of quanta available to the player, and transmit, to the processing device, the signal indicating an introduction of the passively actuated enabling element into the entertainment game.

In accordance with many embodiments, the game world engine is further constructed to determine a wager associated with the gambling event based upon the consumption of the passively actuated enabling element and transmit, to the real world server, a signal indicating the wager.

DETAILED DISCLOSURE OF THE INVENTION

Turning now to the drawings, systems and methods for providing a gambling hybrid game that provides passively triggered wagering are disclosed. In accordance with embodiments of this invention, an entertainment game is provided by an Entertainment System Engine (ESE) and a gambling game is provided by a Real World Engine (RWE). A Game World Engine monitors the game play of the entertainment game provided by the ESE and determines when a gambling event is to occur based on the game play of the entertainment game. The GWE then requests that the RWE resolve the gambling event in the gambling game either while game play in the entertainment game is continued or while is paused to resolve the gambling event. The RWE resolves the gambling event including resolving any wagers on the outcome of a gambling event and provides the results to the GWE. The GWE then determines any effects the results of the outcome of the gambling event have on the entertainment game and updates the ESE accordingly to continue game play.

In many embodiments of Gambling Hybrid Games (HyG), the consumption of an Enabling Element (EE), the occurrence of an Action Element (AE), and/or some other player interaction with an entertainment initiates a gambling event in the gambling game. In accordance with many embodiments of this invention, a gambling hybrid game (HyG) initiates a gambling event based on an event that is not explicitly triggered by a player's action. For example, the consumption of some EE, such as but not limited to armor, may not be explicitly triggered by a player's actions in some embodiments. This type of EE is referred to as a "Passively Actuated Enabling Element" (PAEE) is consumed through entertainment game play but not directly through player action. In many embodiments in accordance with this invention, the consumption of a PAEE initiates a gambling event in a gambling game. When a single PAEE is consumed, and a corresponding commitment of RC can be made to a wager on a gambling event in a gambling game with its associated pay table. In some embodiments, accumulation of PAEE initiates a gambling event in a gambling game.

The gambling hybrid game can provide one or more gambling games. In the gambling game(s), the outcomes of a gambling event and associated wagers are determined solely on the outcome of a Pseudo Random or Random Number Generator (P/RNG) based gaming module. In accordance with embodiments of the invention, the gambling hybrid game offers an enriched gaming experience, based on game play of the fixed shooter game provided by an entertainment system engine which through the game world engine (GWE) of the gambling hybrid game triggers real world gambling events in the one or more gambling games via the real world engine (RWE).

Gambling Hybrid Games

Figure 1:
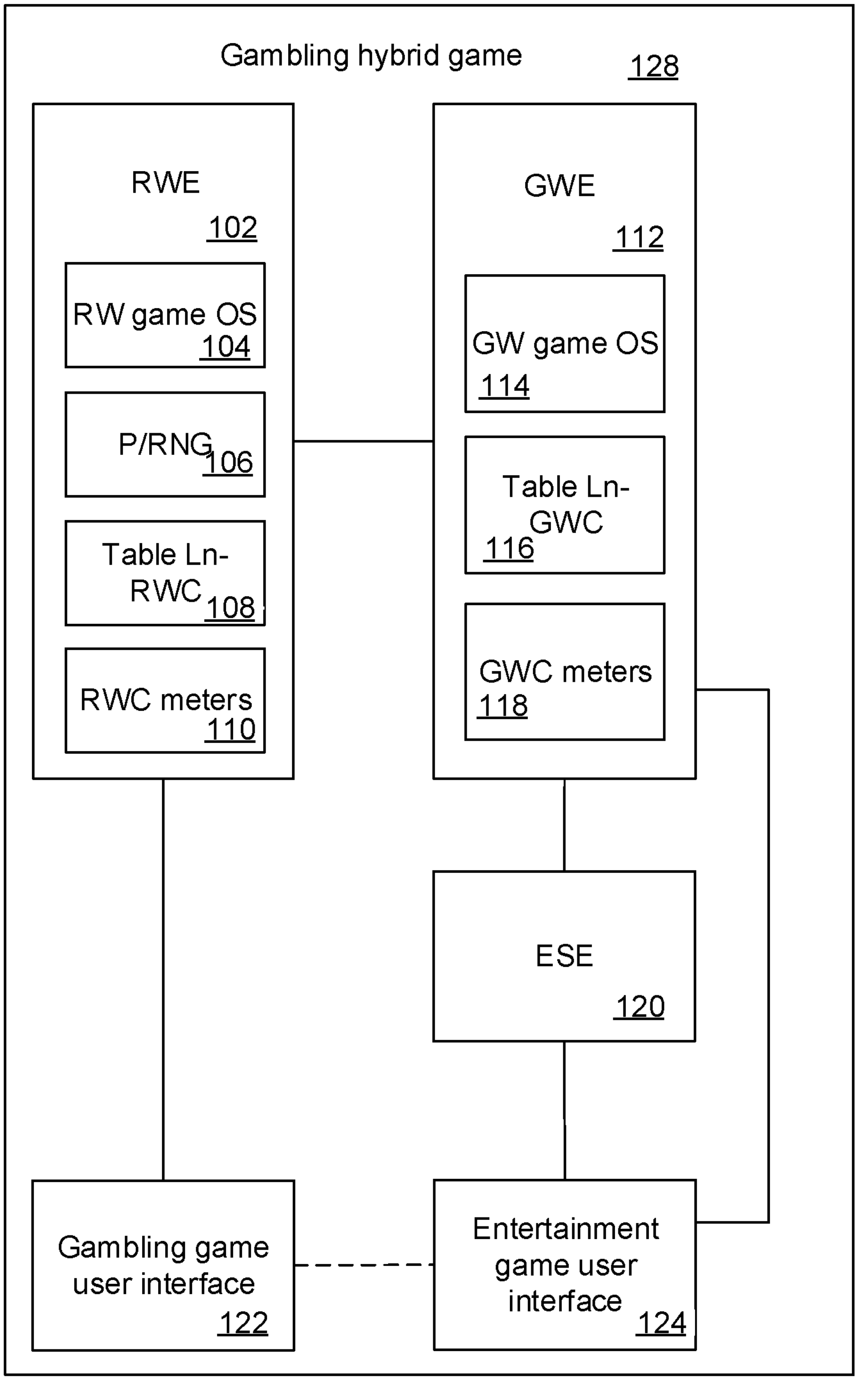
FIG. 1 illustrates a conceptual diagram of components of a gambling hybrid game in accordance with an embodiment of the invention.

In accordance with many embodiments of this invention, a gambling hybrid game integrates high-levels of entertainment content with a game of skill (entertainment game) and a gambling experience with a game of chance (gambling game). A gambling hybrid game provides for random outcomes independent of player skill while providing that the user's gaming experience (as measured by obstacles/challenges encountered, time of play and other factors) is shaped by the player's skill. The outcome of a gambling proposition that is determined by a Pseudo Random or Random Number Generator (P/RNG) or other such device that provides a random outcome in response to a request. In accordance with some embodiments, the wager game may be initiated in response to a game object related player action. A gambling hybrid game in accordance with an embodiment of the invention is illustrated in FIG. 1. The gambling hybrid game 128 includes a Real World Engine (RWE) 102, a Game World Engine (GWE) 112, an Entertainment System Engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the gambling hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE includes a Real World (RW) operating system (OS) 104, P/RNG 106, level n real-world credit pay tables (Table Ln-RC) 108, RC meters 110 and other software constructs that enable a game of chance to offer a fair and transparent gambling proposition, and to contain the auditable systems and functions that can enable the game to obtain gaming regulatory body approval.

A Pseudo Random or Random Number Generator (P/RNG) 106 includes software and/or hardware algorithms and/or processes, which are used to generate random outcomes. A level n real-world credit pay table (Table Ln-RC) 108 is a table that can be used in conjunction with a Pseudo Random or Random Number Generator (P/RNG) 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of a pseudo random or random number generator according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game level n need not be the same for each level.

In accordance with some embodiments of this invention, the GWE 112 manages the overall gambling hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an Operating System (OS) 114 that provides control of the entertainment game. The GWE additionally contains a level n game world credit pay table (table Ln-GWC) 116 from where to take input from this table to affect the play of the entertainment game. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a P/RNG. In accordance with some embodiments, GWCs are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game. The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of this invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a Personal Computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a gambling hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting potions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special potion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a gambling hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the gambling hybrid game can leverage very popular titles with gamers and provides a sea change environment for casinos to attract players with games that are more akin to the type of entertainment that a younger generation desires. In accordance with various embodiments, players can use their skill towards building and banking Game World Credit (GWC) that in turn can be used to enter tournaments and/or win various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, gambling hybrid games also allow players to gain entry into subsequent competitions through the accumulation of Game World Credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The gambling hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

In accordance with some embodiments, the use of the RWE, GWE and ESE allows for the separation of control of a gambling hybrid game between different devices. For example, the ESE may be hosted by a device that is separate from any devices that host the RWE and/or GWE. Through separation of control of the functions of the ESE, RWE and GWE, the RWE may be isolated from the player's device, thus preventing player interference with the RWE and the gambling game. In addition, as the ESE is responsible for providing the entertainment game, gambling hybrid games may provide for complex entertainment games for the player as the ESE need not include the tightly regulated components of the RWE, thus providing for more freedom in ESE design. Also, separation of control allows a GWE to provide complex wager initiation rules that would not be possible if the either the ESE or the RWE were to be in control of the wager initiation.

In accordance with various embodiments, a gambling hybrid game allows for interleaving of continuous wagering within an entertainment game. For example, instead of wagering once, and then playing an entertainment game to completion, or playing an entertainment game to completion and then placing a wager, a gambling hybrid game allows a gaming system or device to be provided to a player where the gaming system or device provides a complex and interesting entertainment game with wagering incorporated throughout the entertainment game.

In various embodiments, a gambling hybrid game provides for feedback into the entertainment game of additional entertainment game resources that are made available in the ESE for the use of the player as the result of wagering outcomes. The additional entertainment game resources may enable portions of the entertainment game that were not available to the player without the resources.

In many embodiments, a gambling hybrid game provides the ability to use the gambling hybrid game in more than one jurisdiction, as the ESE is a component separate from the GWE and RWE. For example, the ESE may be operated as either a pure entertainment game, or as a gambling game depending on the type of characteristics of the RWE that the ESE is coupled to.

In some embodiments, a gambling hybrid game provides for display of an entertainment game on a player's device that the player is using to interact with the entertainment game, as well as providing a separate display of a state of a gambling game on a separate gambling game display. The separate gambling game display may be on the player's device within the same physical display device, on a separate device having a separate physical screen, or on a separate physical display device on the player's device.

Figure 2:
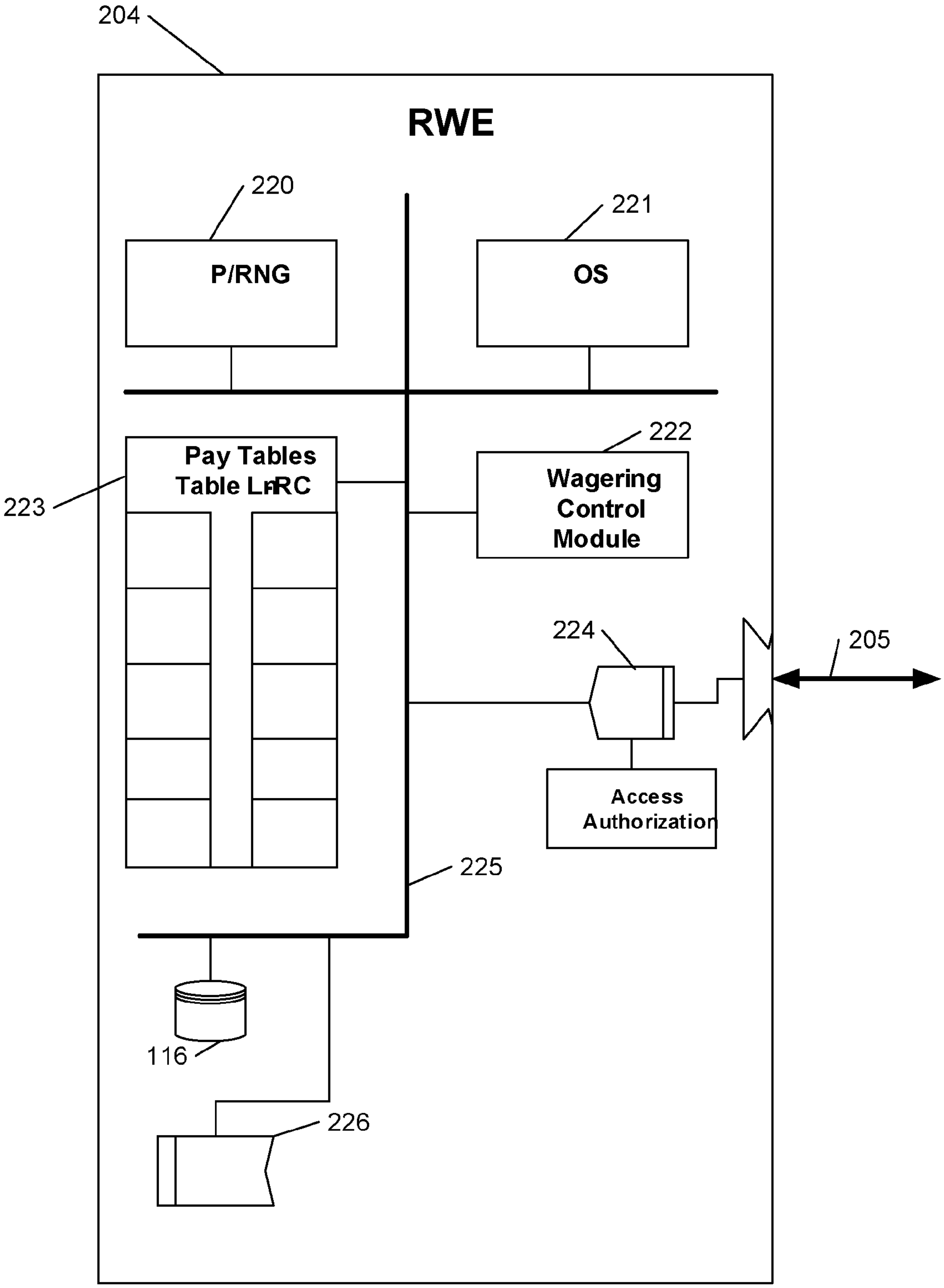
FIG. 2 illustrates a conceptual diagram of aspects of a Real World Engine (RWE) of a gambling hybrid game in accordance with some embodiments of the invention.

The components provided by the RWE for a gambling hybrid game in accordance with embodiments of the invention are shown in FIG. 2. In accordance with embodiments of the invention, the RWE includes an internal bus 225 that connects an operating system OS 221, a Pseudo Random or Random Number Generator (P/RNG) 220, one or more pay tables (Table Ln-RC) 223 which would control the functions of the RWE, a Pseudo Random or Random Number Generator (P/RNG) 220 to produce random numbers, one or more pay tables (Table Ln-RC) 223, a wagering control module 222, an authorization access module 224, and a RC credit meter 226 that are included in the RWE 204. The RW OS 221 controls the functions of the RWE. The P/RNG 220 includes one or more RNGs that are used to produce random numbers for use in resolving gambling events and other process requiring a random number to determine an outcome. The one or more pay tables (Table Ln-RC) 223 contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 926 maintains a record of the amount of RC which player has deposited in the game and has been accumulated by the player.

An external connection allows the RWE 204 to interface to another system or device, which is shown in FIG. 2 as the internet 205 but may be any other network and/or device. The authorization access module 224 of RWE 204 is connected to the external connection and provides a method to permit access and command exchange between an external system and the RWE 204. The RWE 204 also contains storage for statuses, wagers, wager outcomes, meters and other historical events in a storage device 116.

Figure 3:
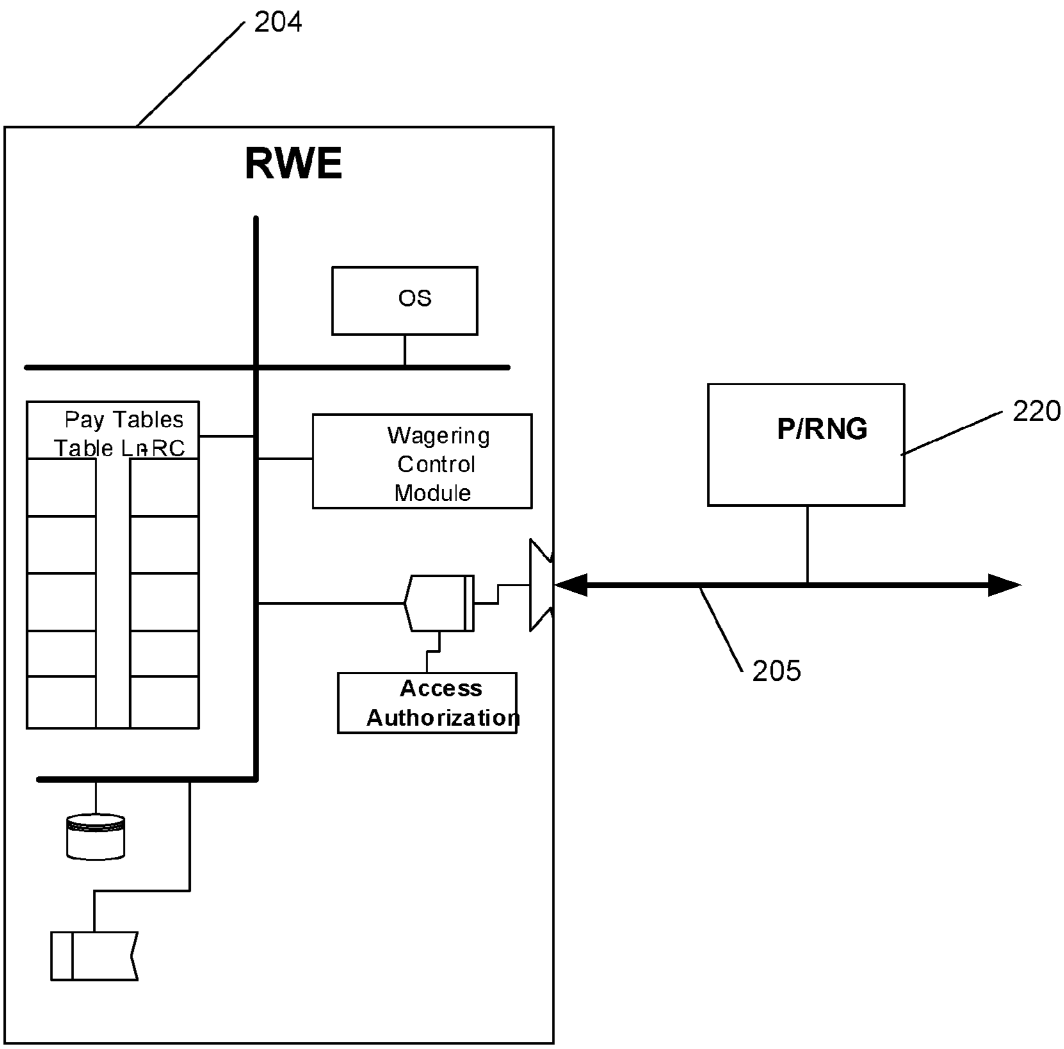
FIG. 3 illustrates a conceptual diagram of aspects of a Real World Engine of a gambling hybrid game in accordance with some other embodiments of the invention.

In some embodiments, the RWE communicates with external systems to provide various functions of a gambling hybrid game in accordance with embodiments of the invention. The components of an RWE that communicate with an external system to provide a component of the RWE in accordance with embodiments of the invention are shown in FIG. 3. The RWE 204 shown in FIG. 3 is similar to the RWE shown in FIG. 2. However, the P/RNG 220 which is an external system connected to the RWE 204 by the internet 905 in accordance with embodiments of the invention. The P/RNG 220 could be a central deterministic system, such as a regulated and controlled random numbered ball selection device, or some other system which provides random or pseudo random numbers to one or a plurality of connected RWEs 204. One skilled in the art will recognize that only P/RNG 220 is an external system in the shown embodiments. However, any of the components could be external systems without departing from the invention and P/RNG 220 is shown as an example only.

In FIGS. 2 and 3, the RWE 204 interfaces with other systems/devices or to an external P/RNG 220 using the Internet 205. However, one skilled in the art will note that nothing would preclude using a different interface than the internet 205 in other embodiments of the invention. Other examples of interfaces include, but are not limited to, a LAN, a USB interface, or some other method by which two electronic and software constructs could communicate with each other.

Figure 4:
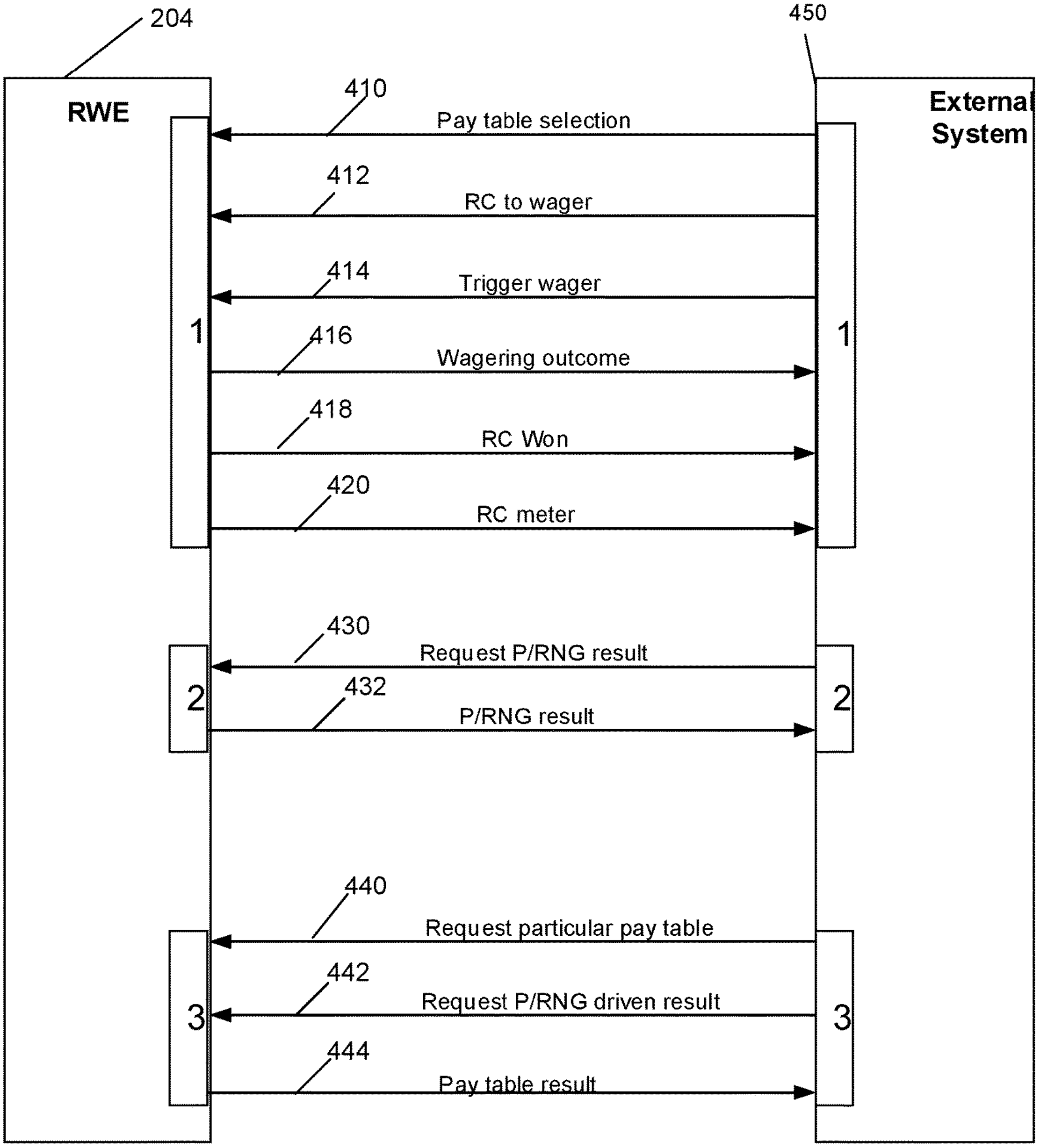
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with embodiments of the invention, the primary function of the RWE 204 is to manage wagering events and to provide random (or pseudo random) numbers from a P/RNG. At the top of the figure, a 6 component communication exchange grouped by the "1" box is shown for a wager on a proposition in a gambling event during a gambling hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing a P/RNG result support from the RWE 204. In this exchange, the external system 450 requests a P/RNG result from the RWE 204 (430). The RWE 204 returns a P/RNG result to the external 450 in response to the request (432). The result may be generated as a function of the internal P/RNG in the RWE 204, or from a P/RNG external to the RWE 204 to which the RWE 204 is connected.

A third communication exchange between the RWE 204 and the external system 405 in accordance with embodiments of the invention that is shown in FIG. 4 is grouped by the "3" box in the figure and relates to the external system 450 wanting support on coupling a P/RNG result to a particular Pay Table contained in the RWE 204. In this exchange, the external system 450 instructs the RWE as to the pay table (Table Ln-RC) to use 450 (440). The external system then requests a result whereby the P/RNG result is coupled to the requested Pay Table (442). The result is returned to the external system 405 by RWE 204 (444). Such an aspect is different from the first exchange shown by the box"1" sequence in that no actual RC wager is conducted. However, such a process might be useful in coupling certain non-RC wagering entertainment game behaviors and propositions to the same final resultant wagering return which is understood for the gambling hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
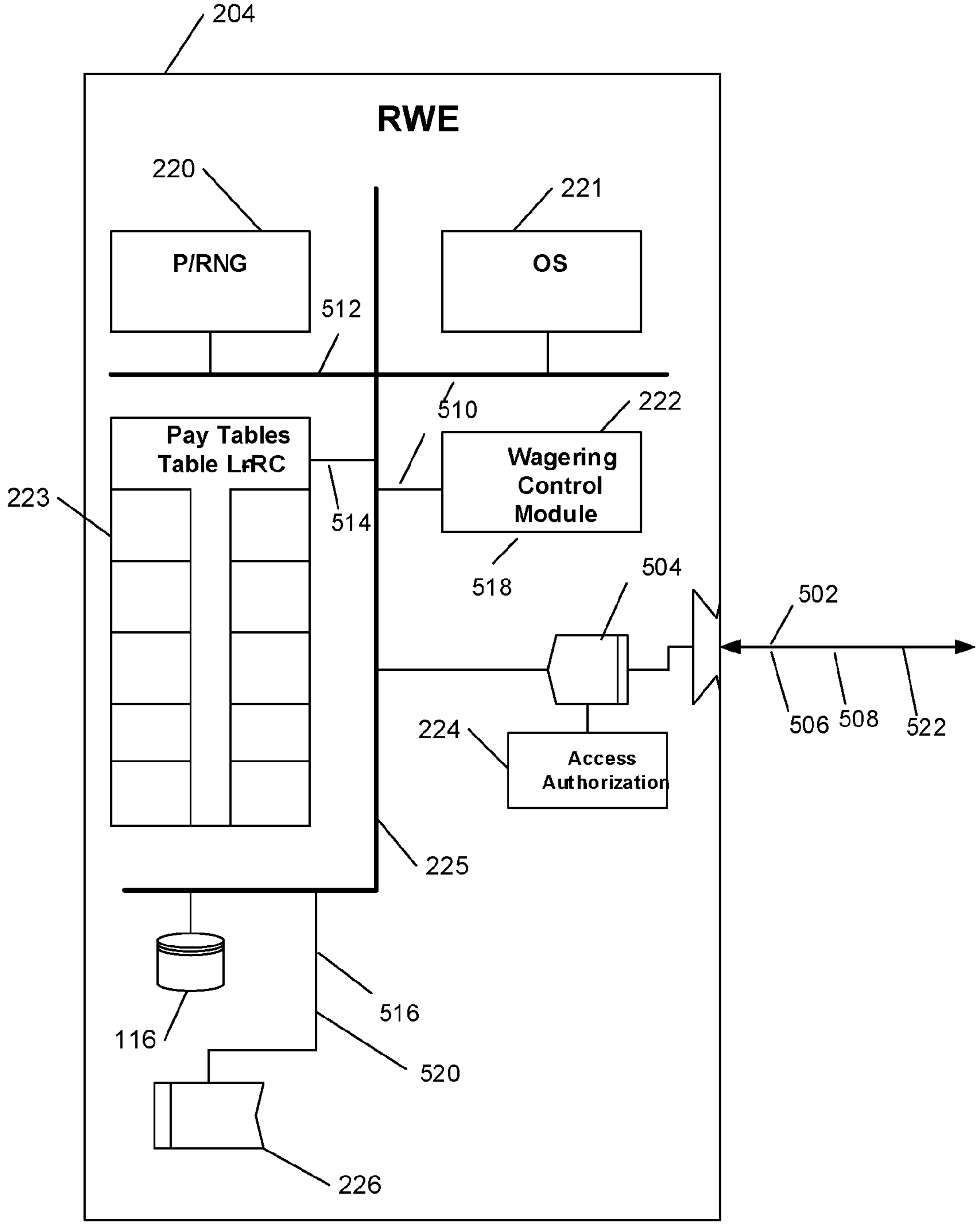
FIG. 5 illustrates a conceptual diagram of a process flow and signaling in a Real World Engine to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204 (502). The Access Authorization Module determines that the external system authorized to connect to RWE 204 (504) and transmits an authorization response to the external system. The external systems that made the request to connect then signals a request for a gambling event is to be performed to RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execute (510). In response to the request to execute the gambling event, the wager control module 222 requests a random number result from the P/RNG 220 (512); retrieves a proper pay table or tables from the pay tables 223 (514); adjusts the RC of the player in the RC repository 226 as instructed (516); applies the P/RNG result to the particular pay table or tables (518); and multiplies the resultant factor from the Pay Table by the amount of RC to determine the result of the wager (518). Wager Control Module 222 then adds the amount of RC won by the wager to the RC repository 426 (520); and provides the outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
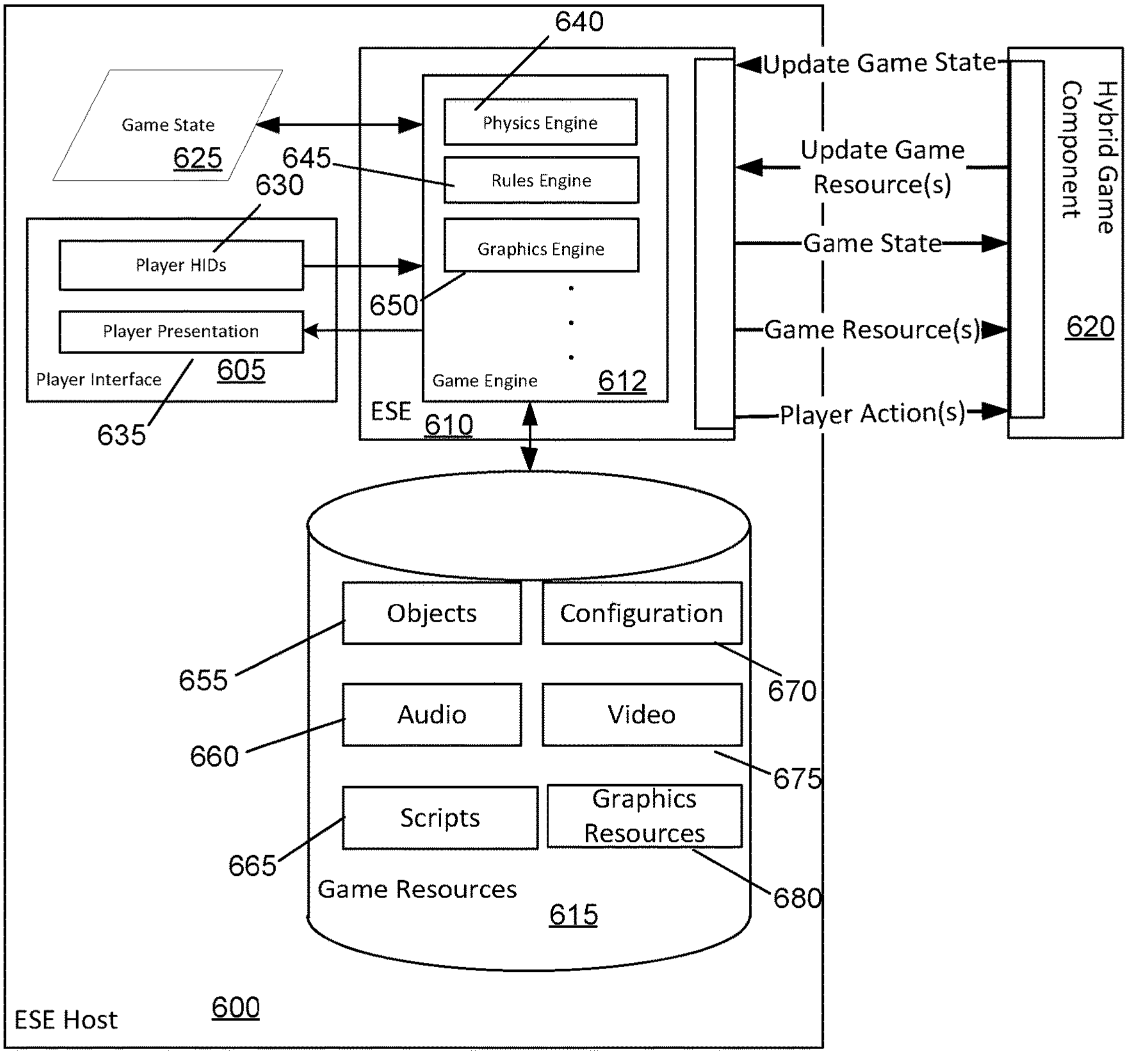
FIG. 6 illustrates a conceptual diagram of aspects of an Entertainment System Engine in accordance with embodiments of the invention.

A block diagram of components an ESE being provided by an ESE host for a gambling hybrid game in accordance with embodiments of the invention are shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, a P/RNG that may be used for influencing or determining certain variables and/or outcomes to provide a randomizing influence on game play, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various game play features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process loops in a game loop continuously while the player plays the game.

In some embodiments, the ESE is a host running a browser that communicates with a server serving documents in a markup language, such as Hypertext Markup Language 5 (HTML 5) or the like, and the functions of the game engine are performed by the browser on the basis of the markup language found in the documents. In some embodiments, the ESE is a host hosting a specialized software platform, such as Adobe Flash or the like, used to implement games or other types of multimedia presentations, and the functions of the game engine are performed by the specialized platform.

The ESE 610 provides one or more interfaces between an entertainment game and other components 620 of a gambling hybrid game, such as a GWE. The ESE 610 and the other gambling hybrid game component 620 communicate with each other using the interfaces, such as by passing various types of data and sending and receiving messages, status information, commands and the like. Examples of communications include, but are not limited to, requesting by the gambling hybrid game component 620 that the ESE 610 update the game state using information provided by the other component; requesting, by the gambling hybrid game component 620, that the ESE 610 update one or more game resources using information provided by the gambling hybrid game component 620; the ESE 610 providing all or a portion of the game state; the ESE 610 providing one or more of the game resources to the gambling hybrid game component 620; and the ESE 610 communicating player actions to the other gambling hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue Game World Credits (GWC) within the entertainment game. These credits can be in the form of (but are not limited to) game world credits, experience points, or points generally. Wagers can be made in the gambling game as triggered by the player's use of one or more elements of the entertainment game. The wagers are made using Real world Credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include Enabling Elements (EE) which are elements that enable a player's play of the entertainment game and whose consumption by the player while playing the entertainment game can trigger a wager in a gambling game. Another non limiting example of an element is a Reserve Enabling Element (REE), which is an element that converts into one or more enabling elements upon occurrence of a release event in skill wagering interleaved game gameplay. Other types of elements include Actionable Elements (AE) which are elements that are acted upon to trigger a wager in the gambling game and may or may not be restorable during normal play of the entertainment game. Another type of element is a Common Enabling Element (CEE) which as an element that may be shared by two or more players and the use of which by any of the players causes a wager to be triggered.

In progressing through entertainment game gameplay, elements can be utilized by a player during interactions with a Controlled Entity (CE) which is a character, entity, inanimate object, device or other object under control of a player.

Also, entertainment game gameplay progress and wager triggers can be dependent upon a game world variable such as, but not limited to: a Required Game Object (RGO) which is a specific game object in an entertainment game acted upon for an AE to be completed (such as but not limited to a specific key needed to open a door); a Required Environmental Condition (REC) which is a game state present within an entertainment game for an AE to be completed (such as but not limited to daylight whose presence enables a character to walk through woods); or a Controlled Entity Characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos. PCT/US11/26768, filed Mar. 1, 2011, PCT/US11/63587, filed Dec. 6, 2011, and PCT/US12/50204 filed Aug. 9, 2012, each disclosure of which is hereby incorporated by reference in its entirety.

Figure 7:
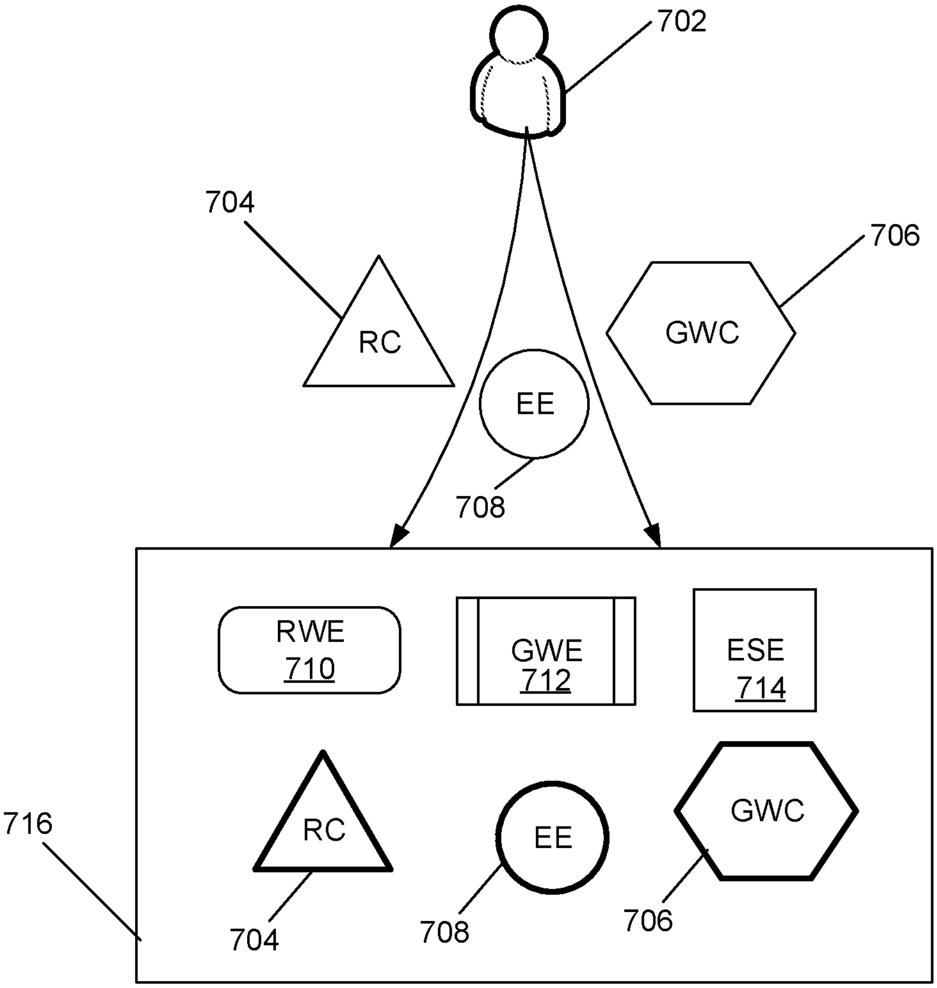
FIG. 7 illustrates a conceptual diagram of interactions between a user and a gambling hybrid game in accordance with embodiments of the invention.

In accordance with some embodiments, a player can interact with a gambling hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to Enabling Elements (EE), are utilized in a gambling hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a based gambling hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on a gambling hybrid game or in a remote server.

Figure 8:
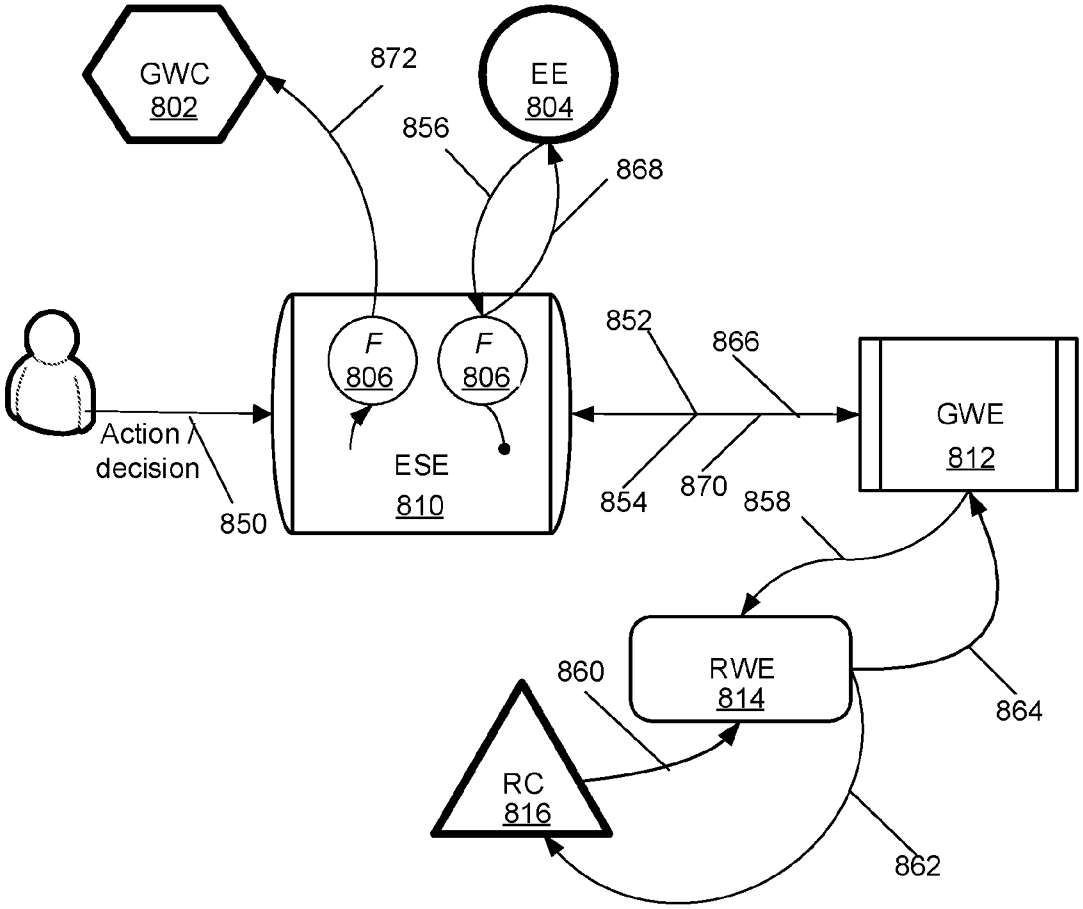
FIG. 8 illustrates a conceptual diagram of the interplay between aspects of a gambling hybrid game in accordance with some embodiments of the invention using Real World Currency (RC).

A conceptual diagram that illustrates the interplay between aspects of a gambling hybrid game in accordance with an embodiment of the invention using Real world Credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the gambling hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC 802 of the entertainment game. The ESE updates the GWC 802 using a function 806 (872).

The following is an example of the above flow in a first person shooter game, such a Call of Duty®, using a gambling hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during game play. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in a gambling hybrid game, but is not intended to be exhaustive and only lists only one of numerous possibilities of how a gambling hybrid game may be configured to manage its fundamental credits.

Figure 9:
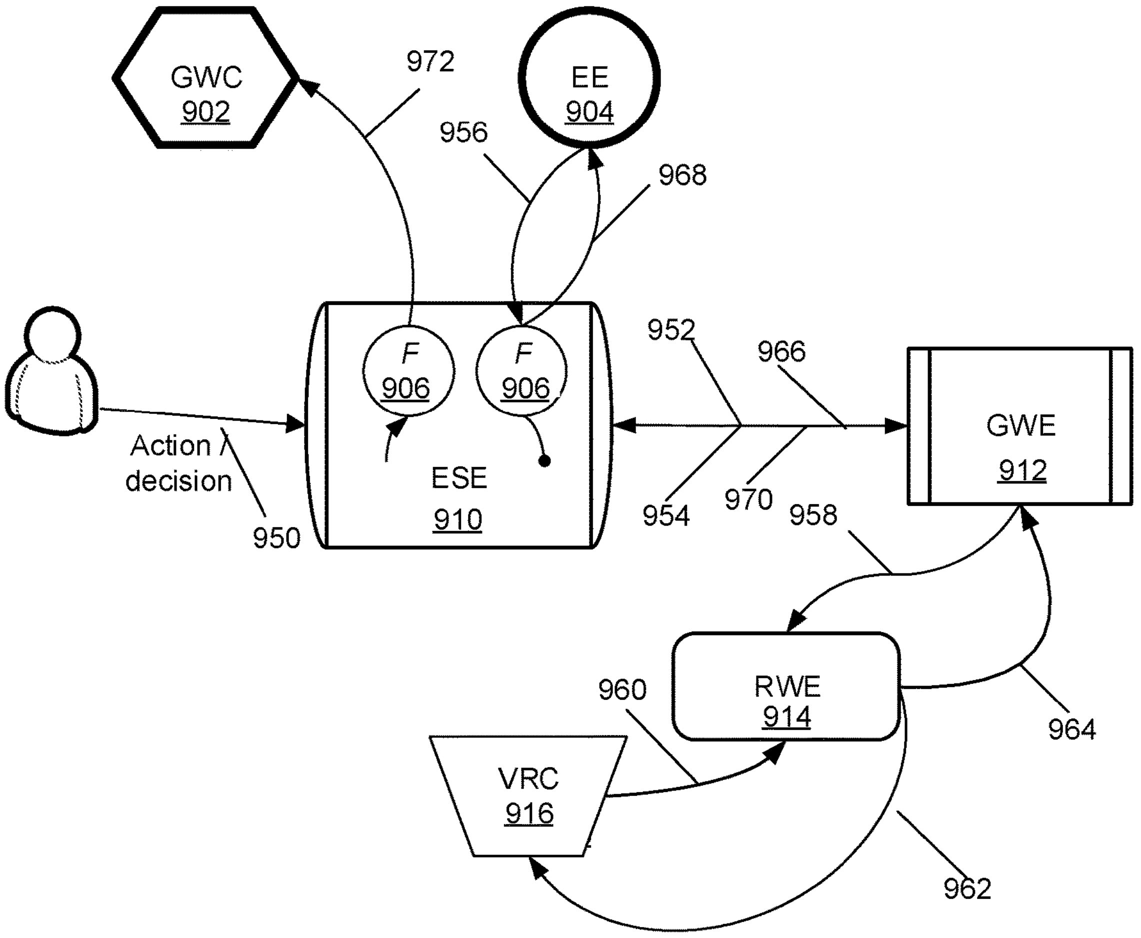
FIG. 9 illustrates a conceptual diagram of illustrates the interplay between aspects of a gambling hybrid game in accordance with other embodiments of the invention using Virtual Real World Currency (VRC).

A conceptual diagram that illustrates the interplay between aspects of a gambling hybrid game in accordance with an embodiment of the invention using virtual real world credit (VRC) is illustrated in FIG. 9. As seen in the FIG. 9, substituting VRC in place of RC is effected without impact to the architecture or operation of the gambling hybrid game. The implementation of FIG. 9 is not the only embodiment using virtual currency within a gambling hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of a gambling hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the gambling hybrid game that Triax Jacks would be wagered in place of RC, such that the gambling hybrid game could be played for free, or with played with operator sponsored Triax Jacks.

Returning to the process in FIG. 9, the following may occur during use of the gambling hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Gambling Hybrid Game

Figure 10:
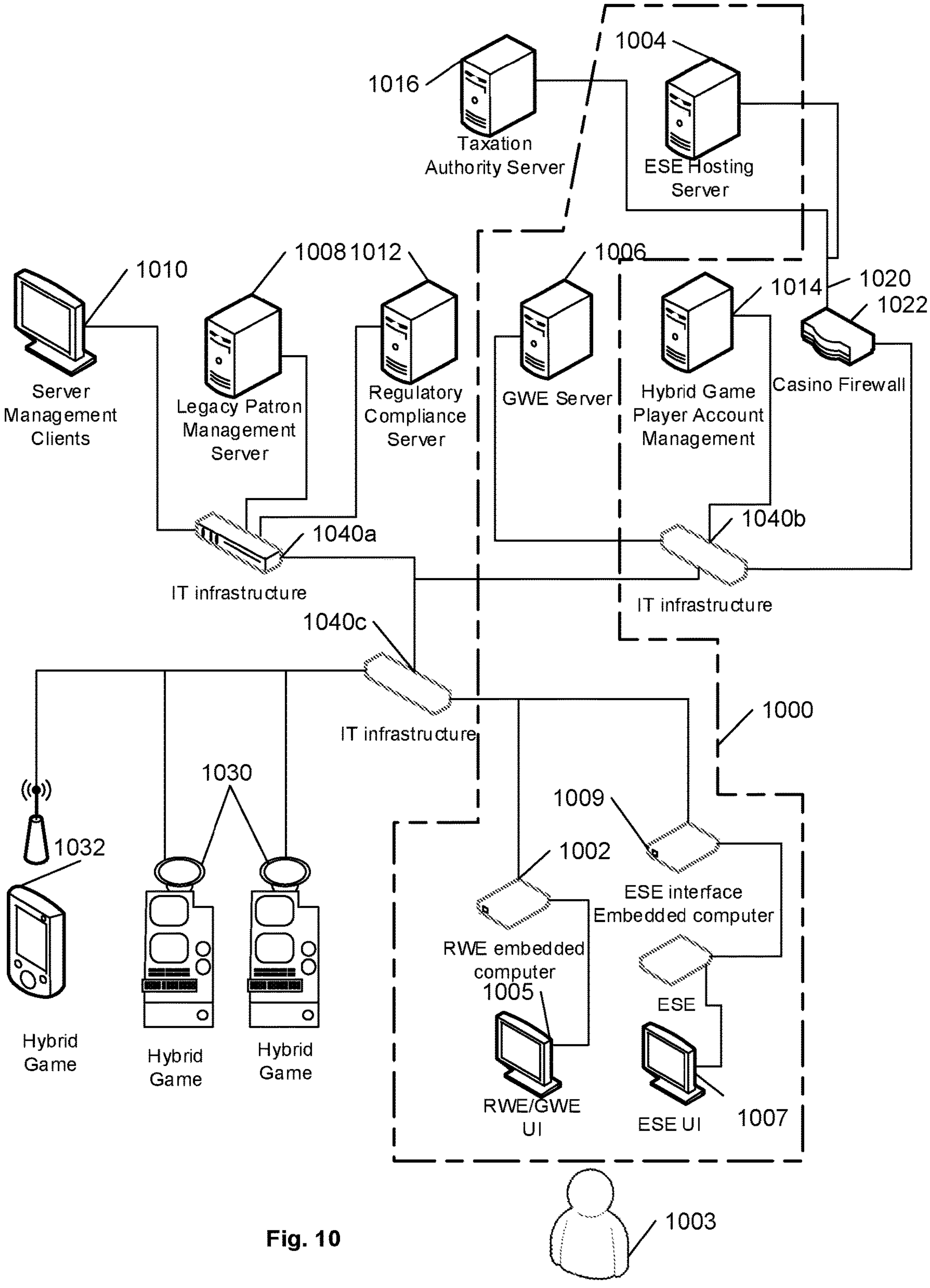
FIG. 10 illustrates a system diagram of an implementation of a network based gambling hybrid game in accordance with another embodiment of the invention.

A system diagram that illustrates an implementation of a network distributed gambling hybrid game with a GWE local server in accordance with embodiments of the invention is illustrated in FIG. 10. In the figure, the gambling hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a gambling hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040*a*, 1040*b* and 1040*c*. It should be understood that FIG. 10 does not attempt to illustrate all servers and systems to which a gambling hybrid game 1000 might be inevitably be connected, and indeed one might expect there would be others, but rather provides an example of a set of a sub-set of systems which would be present in an exemplary embodiment of an installation.

Figure 11:
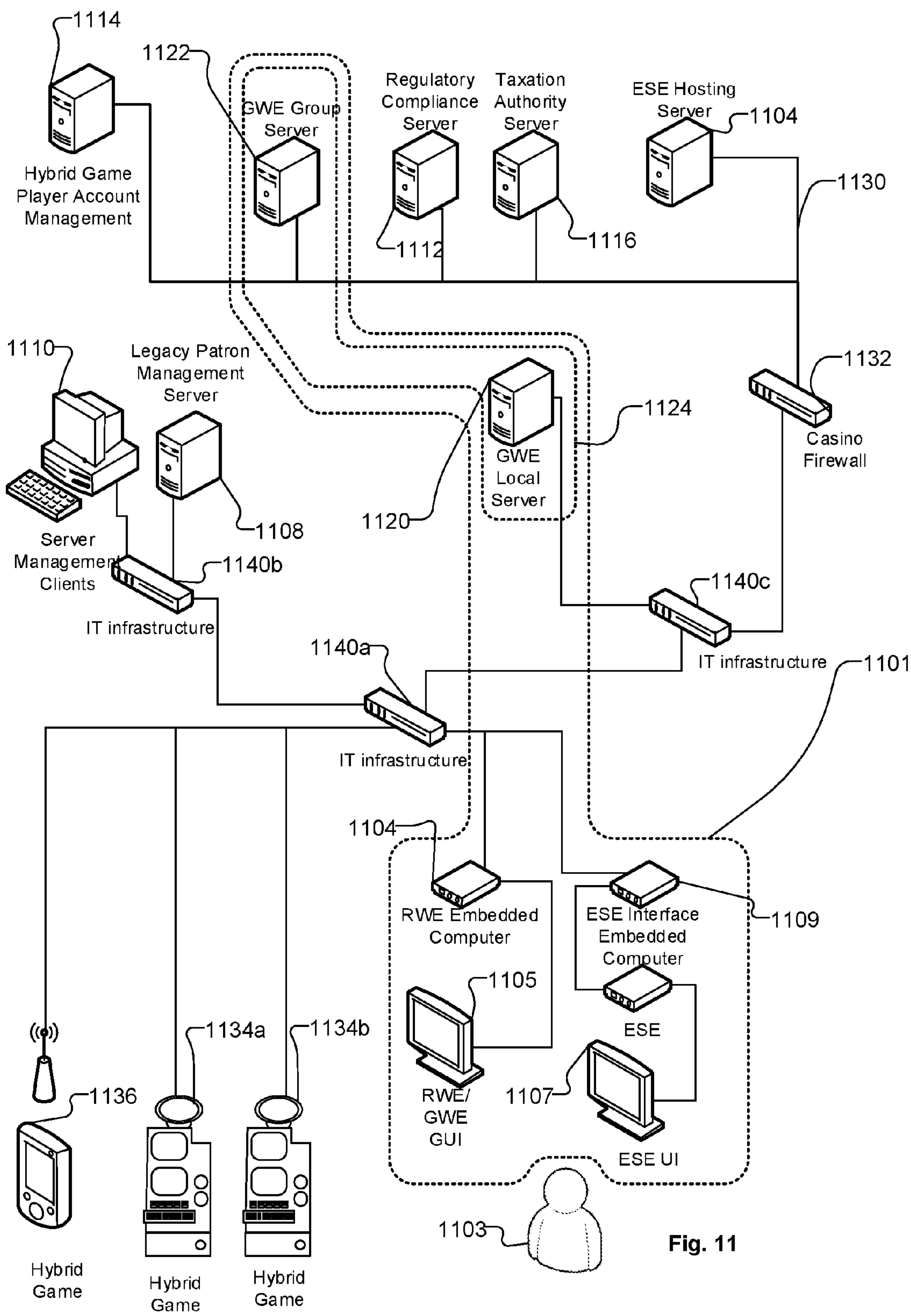
FIG. 11 illustrates a system diagram of an implementation of an Internet based gambling hybrid game in accordance with an embodiment of the invention.

FIG. 11 is a diagram showing another implementation of a gambling hybrid game in accordance with an exemplary embodiment. In the figure, the gambling hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122 (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded gambling hybrid game components via communications network such as the Internet 1130 through a firewall 1132. FIG. 11 also illustrates various other systems, which may reside outside the bounds of the casino and are connected to the framework via communications network. The end devices utilized for user interfaces for a gambling hybrid game include, but are not limited to, casino electronic game machines, 1134*a* and 1134*b*, and wireless or portable devices, such as smart phone 1136, personal digital assistants, tablet computers, video gaming consoles or the like. These disparate devices are connected within and without the casino through the casino's information technology structure as illustrated by routers 1140*a*, 1140*b* and 1140*c*. It should be understood that FIG. 11 does not attempt to illustrate all servers and systems to which a gambling hybrid game might be inevitably be connected, and indeed one might expect there would be others, but rather provides an example of a set of a sub-set of systems which would be present in an exemplary embodiment of an installation.

Figure 12:
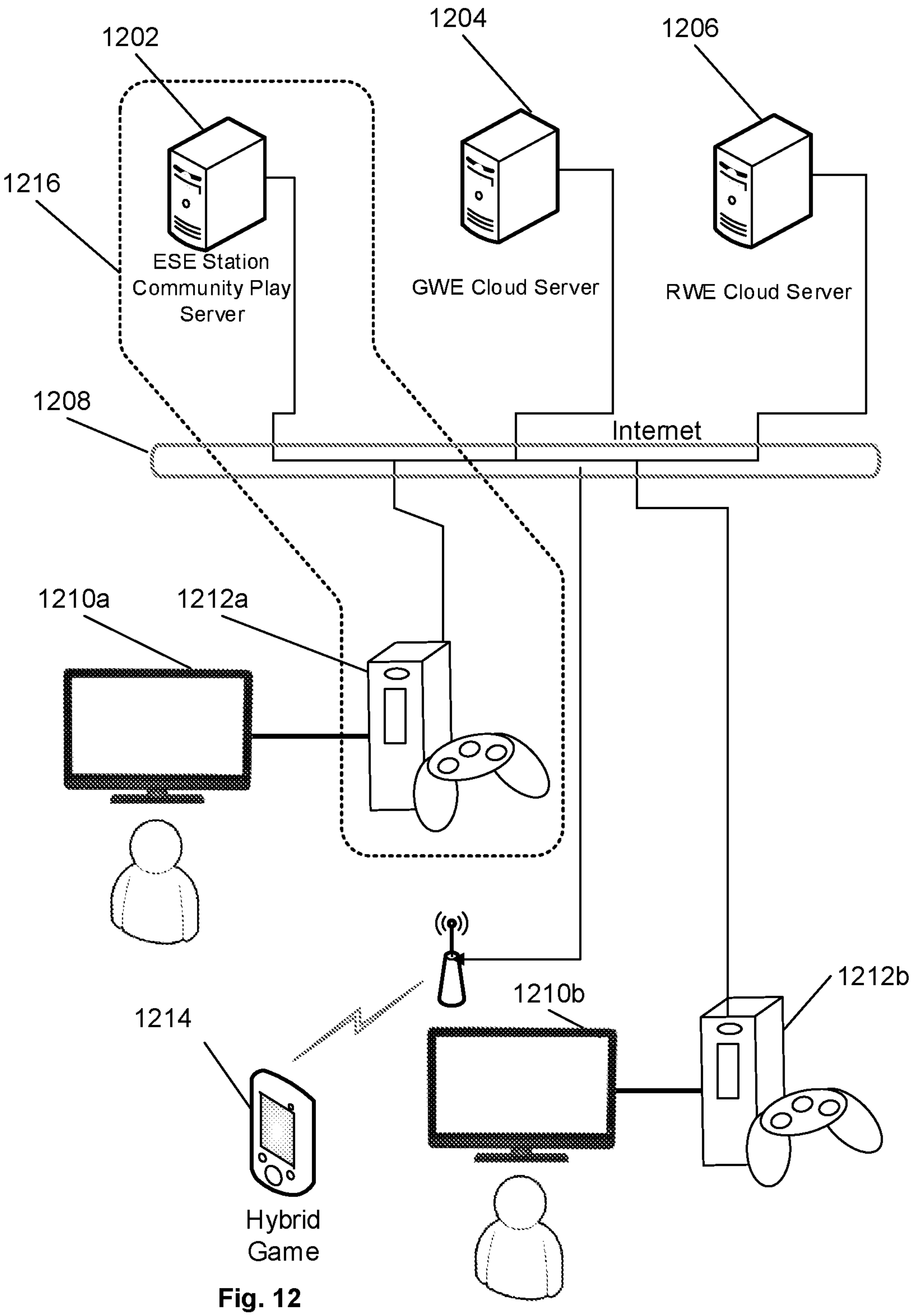
FIG. 12 illustrates a system diagram of an implementation of a cloud based gambling hybrid game in accordance with an embodiment of the invention.

A system diagram that illustrates an implementation of network a cloud based gambling hybrid game over the Internet in accordance with an embodiment of the invention is illustrated in FIG. 12. The system includes an ESE server 1202, GWE server 1204 and RWE server 1206 that each connect to a user interface, 1210*a* or 1210*b*, (such as, but not limited to, a television screen, computer terminal, tablet, touchscreen or PDA) of gambling hybrid games over the Internet 1208. Each gambling hybrid game includes a local ESE 1212*a* or 1212*b* (such as, but not limited to, a video game console or a gaming computer system) that interfaces with a remote ESE server 1002. Processes performed by an ESE 1212*a* or 1212*b* can be performed in multiple locations, such as, but not limited to, remotely on an ESE server 1202 and locally on a local ESE 1212*a*. In addition, a gambling hybrid game may include a Personal Digital Assistant (PDA) 1214 or other type of mobile computing device game coupled to the ESE hosting server 1202, thus providing the opportunity for a player to play a gambling hybrid game on the PDA through a mobile phone or data network.

There are many possible permutations of how a gambling hybrid game could be constructed, with FIGS. 10, 11 and 12 showing only three possible permutations and provided as examples, which are not intended to suggest limitations to the forms of the architecture. Other embodiments include a version where the entire gambling hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
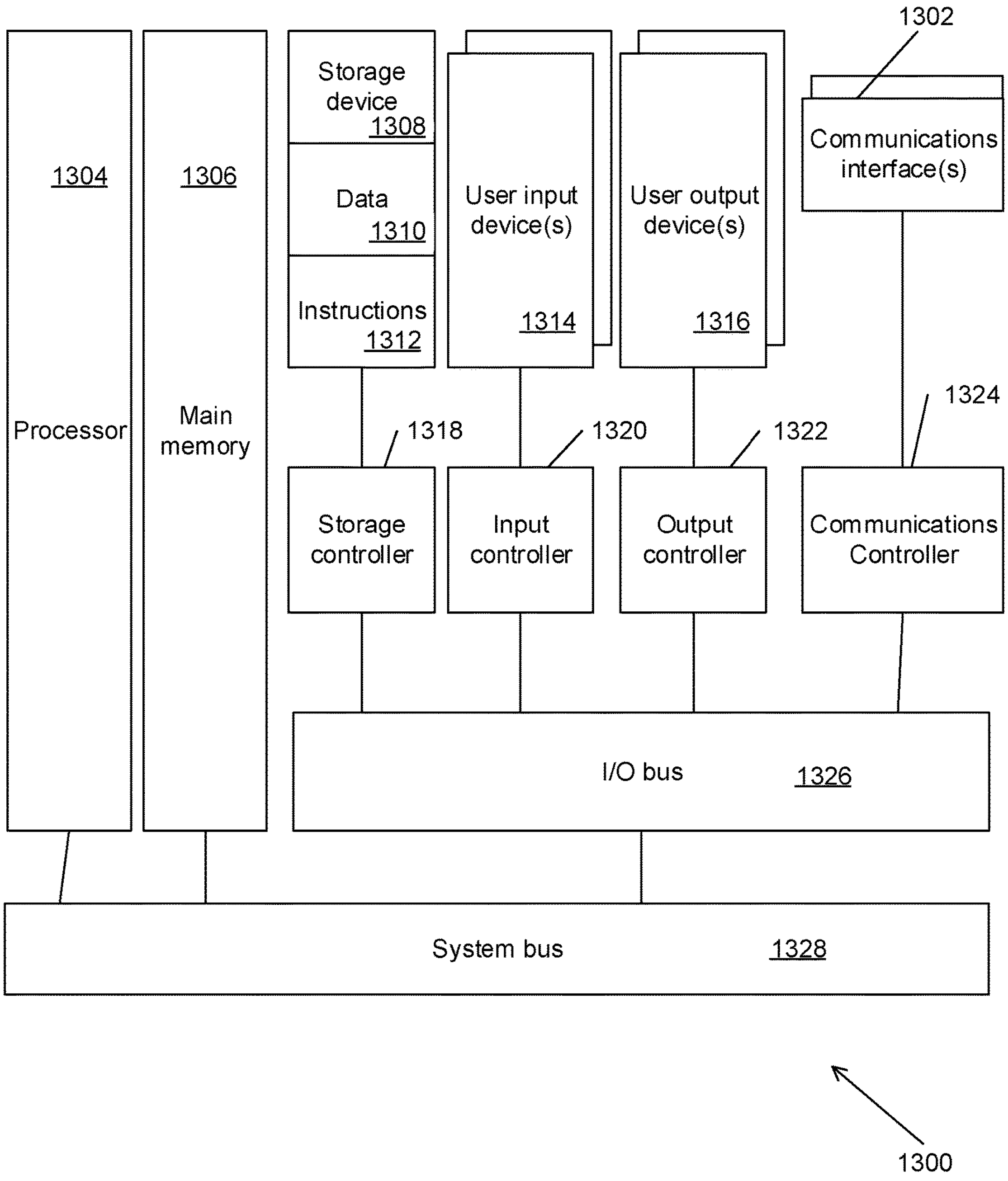
FIG. 13 illustrates a block diagram of components of a device implementing a gambling hybrid game in accordance with an embodiment of the invention.

Any of a variety of processing apparatuses can host various components of a gambling hybrid game in accordance with embodiments of the invention. In accordance with embodiments of the invention, these processing apparatuses can include, but are not limited to, a client, a server, a mobile device such as a smartphone, a personal digital assistant or the like, a wireless device such as a tablet computer or the like, an electronic gaming machine, a general purpose computer, a computing device and/or a controller. A processing apparatus constructed to implement one or more components of a gambling hybrid game in accordance with embodiments of the invention is illustrated in FIG. 13. In the processing apparatus 1300, a processor 1304 is coupled to a memory 1306 by a bus 1328. The processor 1304 is also coupled to non-transitory processor-readable storage media, such as a storage device 1308 that stores processor-executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of a gambling hybrid game. The processor 1304 can utilize various input and output devices in accordance with the instructions and the data in order to create and operate user interfaces for players or operators of a gambling hybrid game (such as but not limited to a casino that hosts the gambling hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, in certain embodiments, the storage device can be accessed by processor 1304 through one of the interfaces or over a network. In some embodiments, a networked storage system, such as a "cloud" storage system, may be used as a storage device. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

A Gambling Hybrid Game with Passively Triggered Wagering

In accordance with some embodiments, the consumption of some EE, such as but not limited to armor, is not explicitly triggered by the player's actions. This type of EE is referred to as a "Passively Actuated Enabling Element" (PAEE) is consumed through entertainment game play but not directly through player action. In accordance with some embodiments, as soon as the PAEE is deployed in the game, the associated RC is considered "cordoned off" and is considered unavailable as regards to the consumption of other forms of PAEE and/or other gambling game initiation modes (i.e. AE, CEE, Manual Triggering, etc.). One skilled in the art will note that the use of PAEE typically results in a more highly skilled player triggering fewer gambling events in the gambling game via PAEE because the skilled player does not consume the EE as quickly. This is demonstrated by an example of armor in a shooting game in which the skilled player does not get hit by fire as frequently as a novice or unskilled player. Thus, triggering less gambling events via the armor.

Other examples of game world elements that may be used as PAEE include, but are not limited to: water, land, sunlight or other game world resources in a farm simulator game; fuel, tires or other game world resources in a racing game; buildable land areas or other game world resources in a city simulation game; and playing piece locations or other game world resources in a board game.

Figure 14:
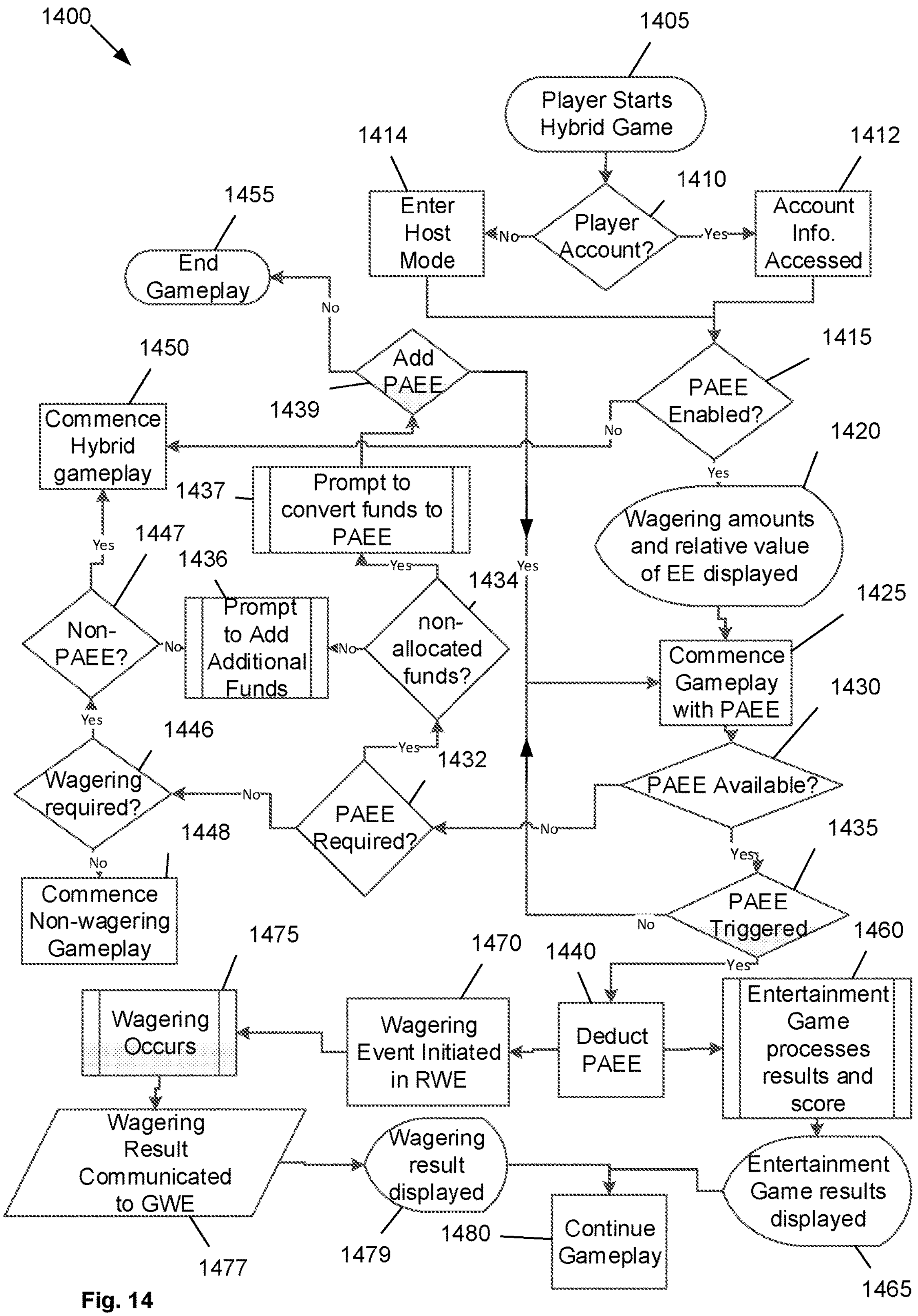
FIG. 14 illustrates a flow diagram of a process performed by a gambling hybrid game to provide passively triggered wagering in accordance with an embodiment of the invention.

A process for providing PAEE enabling gambling events in a gambling hybrid game in accordance with embodiments of this invention is shown in FIG. 14. In process 1400, the player begins playing the gambling hybrid game (1405). The start of play may be commenced by the player entering a specific amount of RC or VRC to play. A minimum amount of RC may be required by the casino to enable play. Upon starting the game, the player selects (1410) between using either an account version in which a player account is used to provide Real World Credits (RWC) and/or game world credits (GWC) and the account information of the player is accessed (1412); or a stand-alone or host version (1414) of the game in which RWC and/or GWC is entered on a per-play basis.

Regardless of the selected type of game play, the ESE determines whether a PAEE is enabled (1415). In accordance with embodiments of this invention, the use of a PAEE may not be allowed during the entirety of entertainment game play. A PAEE may be enabled in a variety of ways in accordance with different embodiments of the invention. In accordance with some embodiments, the logic by which PAEE is used by a player may be established at the onset of gambling hybrid game play, in real time during gambling hybrid game play, or at other times as dictated by the gambling hybrid game possibly as a function of casino input or other inputs. In accordance with some embodiments, a PAEE is enabled by conversion choices affected by the player in the entertainment and/or gambling game. In a number of embodiments, a PAEE may be enabled by the casino or other providers choices which may be temporal or permanent in nature or a combination thereof. In accordance with many embodiments, the PAEE may be enabled from one or more variables within the entertainment game. In accordance with some embodiments, the PAEE may be enabled from one or more variables within the player profile. In accordance with some embodiments, the PAEE may be enable from variables based on gambling wins. The GWE may or may not also take into account the entertainment game state, and/or other variables to enable a PAEE.

Furthermore, the use of PAEE within a specific gambling hybrid game can be affected at any time at the behest of a player; a casino or other provider; and/or the gambling hybrid game logic in accordance with a number of embodiments. In some embodiments, the use of a PAEE can be enabled at specific times dictated by the entertainment game play; gambling hybrid game logic; the casino or other provider; regulatory restrictions or rules; or other factors.

To enable a PAEE, the PAEE may be accessed by a player in a variety of ways in various embodiments of the invention. In some embodiments, RC may be specifically allotted to PAEE at the start of gameplay of the gambling hybrid game. PAEE may not be purchased during gameplay, and only PAEE initiates wagers during gameplay. In many embodiments, RC may be specifically allotted to PAEE at the start of gameplay. Further PAEE may not be purchased during gameplay, and different EE types including PAEE initiate wagers during gameplay. These different EE may be associated with different pay tables.

A specific PAEE may be enabled in the gambling hybrid game in a variety of ways. In some embodiments, a player may elect to purchase PAEE during gameplay of the entertainment game. Once purchased, additional PAEE may not be added during gameplay of the entertainment game. In many embodiments, a player may elect to purchase PAEE during gameplay. Once purchased, additional PAEE may be added during gameplay. In a number of embodiments, a portion of a feedback loop from gameplay of the entertainment game will result in the availability of PAEE during gameplay. PAEE may or may not be purchased automatically. In some embodiments, winning a certain amount of quanta will enable PAEE as discussed further below. In several embodiments, gaining a specific skill level will enable one or more PAEE. In many embodiments, obtaining a specific Game World Object will enable one or more PAEE.

If a PAEE is not enabled, the gambling hybrid game commences game play of the entertainment game and gambling events in the gambling game are initiated in another manner (1450).

The gambling hybrid game displays the wagering amounts and the relative EE values of the selected PAEE(s) in the entertainment game (1420). The entertainment system engine then commences game play of the entertainment game (1425). If the player has played the game before, the player may have the ability to select one of a multitude of levels to play as a function of information stored in their player account. In some embodiments, the player must commence play at a prescribed level. Players that demonstrate exceptional skill may also be exposed to specific "bonus" levels with enhanced game play (in terms of the entertainment game and/or gambling game play).

The GWE determines whether there is at least one PAEE available to the user (1430). If not, the gambling hybrid game determines whether a PAEE is required for game play (1432). If a PAEE is required, the gambling hybrid game determines whether the players have funds available to purchase the PAEE in the entertainment game via GWE, VRC, and/or quanta; and/or whether the player has sufficient RWC and/or VRC to cover wagers associated with the PAEE (1434). If the player does not have the requisite funds available to purchase the PAEE and/or cover the wagers, the gambling hybrid game may prompt the user to provide additional funds to purchase the PAEE and/or cover the wager (1436). If the funds are available or after additional funds are added to funds to purchase the PAEE and/or cover the wager, the gambling hybrid game prompts the user to convert the funds to the required PAEE (1437). If the PAEE is added, game play of the entertainment game continues (1425). Otherwise, game play of the gambling hybrid game is ended.

If the PAEE is not determined to be required for game play (1432), the gambling hybrid game determines whether wagering on gambling events is required (1446). If wagering on gambling events is not required, non-wagering gameplay of the entertainment game commences (1448). If wagering is required, the gambling hybrid game determines if another type of trigger for a gambling hybrid game is available and if the player has sufficient RC and/or VRC to wager (1447). If the player does not have sufficient funds for the gambling game, the player is prompted to add additional funds (1436). If the player is determined to have sufficient funds and/or additional funds are added, the gambling hybrid game commences game play of the entertainment game and gambling events in the gambling game are initiated in another manner (1450).

If at least one PAEE is available, the GWE monitors game play through updates from the ESE to determine if the PAEE is triggered (1435). If the PAEE is not triggered, gameplay continues until the PAEE is triggered. If the PAEE is triggered during game play of the entertainment game, the entertainment system engine deducts the PAEE (1440). The ESE also determines the result and score from the triggering of the PAEE (1460) and displays the result as part of the game play (1465). The game world engine triggers a gambling event in a gambling game with the wager(s) associated with the PAEE (1470).

The real world engine determines the results of the gambling event and the associated wager(s) associated with the PAEE (1475). In some embodiments, each PAEE is associated with a different pay table, and the pay table information for each PAEE may be described to the player in general or specific terms as part of a set up process or introductory screens. The pay table information may also be available at all times through a drop-down or pull-up display of "info", a separate physical display, a graphical overlay, other user interface or the like.

The results of the gambling event are then provided by the RWE to the GWE (1477) and the results of any wagers are displayed to the player (1479). The game play of the entertainment game then continues (1480). If a player runs out of a PAEE, several embodiments of the invention require the selection or purchase of additional PAEE using RC before additional EE can be consumed or AE undertaken in entertainment game. In other embodiments, if a player runs out of PAEE, the entertainment game can still be played, but in a non-gambling mode only or in a virtual currency mode only.

Figure 15:
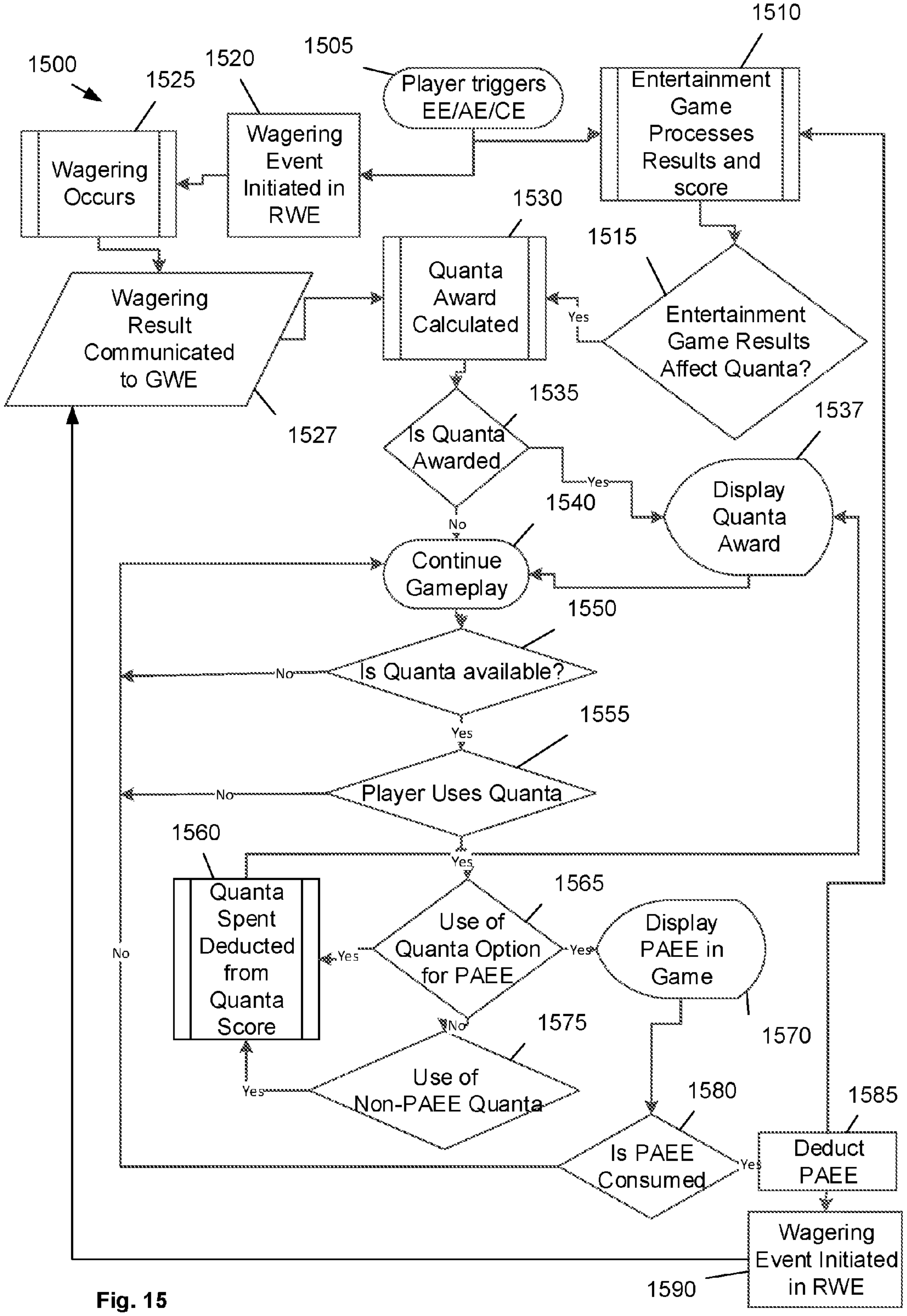
FIG. 15 illustrates a flow diagram of a process performed by a gambling hybrid game to provide passively triggered wagering with quanta awarded based on a result of a gambling event and/or game play of an entertainment game in accordance with an embodiment of the invention.

In accordance with some embodiments, the result of a gambling event of a gambling game and/or a combination of the results of the gambling event of the gambling game and game play of the entertainment game are used to determine an amount of quanta to award a player. For purposes of this discussion, quanta is a currency that may be exchanged to change an entertainment game characteristic. A process performed by a gambling hybrid game to award quanta based on the result of a passively triggered gambling event of a gambling game and the results of game play of the gambling game in accordance with embodiments of the invention is show in FIG. 15.

In process 1500, a AE, CE, EE, PAEE or other interaction between player resources and entertainment game resources occurs (1505). The entertainment system engine then determines the results of the action and updates the game parameters including, but not limited to, the score (1510). The game world engine detects the occurrence of the interaction and determines whether a gambling event is to occur based on the action. The game world engine can detect any of a variety of triggering events appropriate to the requirements of a particular entertainment game being provided by the gambling hybrid game. To resolve the gambling event, the game world engine requests that the real world engine determine the result of the gambling event in the gambling game(s) and associated wagers (1520). The real world engine determines the results of the gambling event and any associated wagers (1525). The results of the gambling event are then provided by the RWE to the GWE (1527) and the results of any wagers are displayed to the player.

The GWE obtains the results of the gambling event and associated wagers from the RWE. These results are used to determine the amount of quanta to award the player in some embodiments. If the entertainment game results of the occurrence also affect the amount of quanta awarded, the results of the occurrence in the entertainment game are provided to the GWE (1515) from the ESE. Based upon the results of the gambling event received from the RWE and possibly the results of the play of the entertainment game received from the ESE, the GWE determines an amount of quanta (if any) to award the player (1530). If quanta is awarded (1535), the amount of quanta awarded, and/or the total amount of quanta available to the player are displayed (1537). Regardless of the award of quanta, game play of the entertainment game is continued by the ESE (1540). During game play, quanta based play may be made available (1550) to the player. For purposes of this discussion, quanta based play means that the gambling hybrid game provides the option to a player to exchange an amount of quanta for a change to a game characteristic of the entertainment game. In accordance with many embodiments, the quanta may be exchanged to purchase a game element that affects a game characteristic. Some examples of game elements that may be purchased using quanta include, but are not limited to, improved weapons, extra lives, improved vehicles, shielding, "slow down" of the enemy movements, and a pause in enemy movements. In accordance with many embodiments of the invention, each of the game elements affects a characteristic, for example an improved weapon may changes the game characteristic of firing rate from one shot per firing to two shots per firing. One skilled in the art will recognize that these are only examples and other changes to the game characteristics of the entertainment game in exchange for a certain amount of quanta may be offered in accordance with embodiments of this invention.

If quanta based play is available, the GWE detects when the player exchanges quanta to change a game characteristic (1555). In accordance with some embodiments, the user may use the quanta to purchase a PAEE (1765). The RC for a wager associated with the PAEE is obtained from the player and the quanta spent by the player is deducted from the amount of quanta available to the player (1560). The PAEE is displayed in the entertainment game (1570) and game play using the PAEE then begins. When the PAEE is expended (1580), the ESE indicates that the PAEE is consumed and determines the results in the entertainment game accordingly (1585). The GWE also requests the determination of results of a gambling event and the wager associated with the PAEE from the RWE (1590). The RWE determines the result of the gambling event and the wager on the result of the gambling event associated with the PAEE and provides the result to the GWE (1527).

If the player uses the quanta to change a game characteristic in a conventional manner by purchasing a non-PAEE element (1575), the quanta spent on the change of a game characteristic can be deducted from the amount of quanta available to the player (1560) and information regarding the change in the game characteristic is provided to the ESE for incorporation in the continuation of game play (1540).

Although specific processes for conducting a gambling hybrid game in which the passive consumption of enabling elements triggers gambling events are discussed above with respect to FIGS. 14 and 15, any of a variety of processes for passively triggering gambling events within a gambling hybrid game can be utilized as appropriate to the requirements of specific applications in accordance with embodiments of this invention.

Examples of Gambling Hybrid Games with Passively Triggered Wagering

In accordance with many embodiments, the gambling hybrid game provides a fixed shooter game as an entertainment game. In accordance with embodiments providing a fixed shooter game, a player may use a "shield" that has certain durability. For example, the case where the player has elected to use RC or quanta to buy three armor units. The three armor units allow the player's ship to be hit three times by alien fire before the ship is destroyed (with the fourth such hit). When the player's ship takes a hit from an alien, a single armor unit (EE) is consumed, and a corresponding commitment of RC is made to a gambling proposition with its associated pay table.

In many embodiments the gambling hybrid game provides a shooter game as the entertainment game. In some embodiments, a player may use armor that protects from specific weapons. For example, the case where a player has elected to use RC or quanta to buy fire-proof armor that may consume 5 shots from an enemy. This allows a player to be hit five times with a flame-thrower weapon without taking health damage until the PAEE is consumed. When the player takes a hit from a specific weapon, a single armor unit (PAEE) is consumed, and a corresponding commitment of RC is made to a gambling proposition with its associated pay table. Other weapons may cause damage to the player without committing RC to a gambling proposition.

In some embodiments, the gambling hybrid game provides a word game as the entertainment game and PAEE may be provided in the following manner. An opponent playing a word on a bonus tile that is part of the playing board and not placed there by the player, thus consuming a PAEE and a corresponding commitment of RC is made to a gambling proposition for the player as a result of the gameplay of the opponent, with the RC commitment's associated pay table. Other tiles may cause damage to the player without committing RC to a gambling proposition.

A gambling hybrid game provides a map-based conquest game as the entertainment game in some embodiments. In a number of these embodiments, an opponent invading other nations may consume "home guards" or soldiers of a player that are each PAEE, and a corresponding commitment of RC is made to a gambling proposition for the player as a result of the gameplay of the opponent, with the RC commitment's associated pay table.

A game similar to MONOPOLY™ distributed by Hasbro Inc. of Pawtucket, R.I. is provided as an entertainment game in a gambling hybrid game in accordance with some embodiments. In a number of these embodiments, a PAEE is house, hotel, and/or property may be a PAEE. A PAEE is enabled by a player placing a hotel on property the player owns and may require a commitment of funds to the PAEE. If an opponent lands on that square, the PAEE is triggered, causing a gambling event having a commitment of RC from the player, where the gambling event is for the player that placed the hotel on the property. In some embodiments, the gambling event creates a commitment of RC from the player's opponent who landed on the property with the gambling event being for the player's opponent.

In some embodiments, a gambling hybrid game provides a board game as the entertainment game. The board game may be, but is not limited to, chess or checkers. A specific game piece of a player may be a PAEE in accordance with some embodiments. A value may be assigned to a particular piece, and bets for the player are triggered if an opponent captures that particular piece.

In accordance with some embodiments, the availability of various PAEE can be indicated to the player graphically via the conversion, for example, of an icon representing PAEE options from "greyed out" to "full color" when the factors that are required for the conversion are met within the Hybrid Game. In a number of embodiments, PAEE may be automatically allocated based on the RC available and continually updated through gameplay.

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that a hybrid gaming system may be practiced otherwise than as specifically described. Thus, the foregoing description of the hybrid gaming system should be considered in all respects as illustrative and not restrictive, the scope of the claims to be determined as supported by this disclosure and the claims' equivalents, rather than the foregoing description.

What is claimed:

1. An electronic gaming machine constructed to receive real world credits from a player, comprising:

an entertainment system engine connected to a visual output device constructed to:

provide an entertainment game including a passively actuated enabling element wherein the passively actuated enabling element is an enabling element that is consumed through game play of the entertainment game in a manner that is not directly responsive to a player action;

provide a visual display of the entertainment game;

determine when the passively actuated enabling element is consumed in the entertainment game;

generate a signal indicating a consumption of the passively actuated enabling element;

transmit, to a game world controller, the signal indicating the consumption of the passively actuated enabling element;

receive, from the game world controller, a signal including a result of a gambling event;

generate a visual display of the result of the gambling event; and a real world engine constructed to:

receive, from the game world controller, a signal including a request for a resolution of the gambling event;

generate a result of the gambling event using a random number generator for the gambling event;

transmit, to the game world controller, the signal including the result of the gambling event; and the game world controller, connected to the entertainment system engine and connected to the real world engine via a communication link, constructed to:

continuously monitor the entertainment system engine to determine if at least one passively actuated enabling element is available;

determine that a player account includes a sufficient amount of real world credit for a wager associated with the passively actuated enabling element when the passively actuated enabling element is introduced into the entertainment game;

automatically reserve the sufficient amount of real world credit in the player account for use on the wager when it is determined that the passively actuated enabling element is available;

continuously monitor the entertainment system engine for the signal indicating that the passively actuated enabling element has been consumed;

receive, from the entertainment system engine, the signal indicating the consumption of the passively actuated enabling element;

initiate the gambling event based on the signal indicating that the passively actuated enabling element has been consumed;

transmit, to the real world engine, the signal including the request for the resolution of the gambling event;

receive, from the real world engine, the signal including the result of the gambling event; and transmit, to the entertainment system engine, the signal including the result of the gambling event.

2. The electronic gaming machine of claim 1 wherein the game world controller is further constructed to automatically award an amount of a currency that may be used to change an entertainment game characteristic based on the result of the gambling event.

3. The electronic gaming machine of claim 1 wherein the game world controller is further constructed to automatically award an amount of a currency that may be used to change an entertainment game characteristic based on the result of the gambling event as well as the result of the consumption of the passively actuated enabling element in the entertainment game.

4. The electronic gaming machine of claim 1 wherein the game world controller is further constructed to:

provide the passively actuated enabling element that may be introduced into the entertainment game using a currency that may be used to change an entertainment game characteristic;

receive, from the entertainment system engine, the request from a player to introduce the passively actuated enabling element into the entertainment game;

deduct an amount of the currency required to introduce the passively actuated enabling element into the entertainment game from the amount of quanta available to the player; and transmit, to the entertainment system engine, the signal indicating an introduction of the passively actuated enabling element into the entertainment game.

5. The electronic gaming machine of claim 1, wherein the real world engine and the game world controller are constructed from different processing apparatuses, and wherein the game world controller and the real world engine are connected by a network.

6. The electronic gaming machine of claim 1, wherein the game world controller and the entertainment system engine are constructed from different processing apparatuses; and wherein the game world controller and the entertainment system engine are connected by a network.

7. An electronic gaming machine constructed to receive real world credits from a player, comprising:

an entertainment system engine connected to a visual output device constructed to:

provide an entertainment game including a passively actuated enabling element wherein the passively actuated enabling element is an enabling element that is consumed through game play of the entertainment game in a manner that is not directly responsive to a player action;

provide a visual display of the entertainment game;

determine when the passively actuated enabling element is consumed in the entertainment game;

generate a signal indicating a consumption of the passively actuated enabling element;

transmit, to a game world controller, the signal indicating the consumption of the passively actuated enabling element;

receive, from the game world controller, a signal including a result of a gambling event;

generate a visual display of the result of the gambling event; and the game world controller, connected to the entertainment system engine and connected to a real world engine via a communication link, constructed to:

continuously monitor the entertainment system engine to determine if at least one passively actuated enabling element is available;

determine that a player account includes a sufficient amount of real world credit for a wager associated with the passively actuated enabling element when the passively actuated enabling element is introduced into the entertainment game;

automatically reserve the sufficient amount of real world credit in the player account for use on the wager when it is determined that the passively actuated enabling element is available;

continuously monitor the entertainment system engine for the signal indicating that the passively actuated enabling element has been consumed;

receive, from the entertainment system engine, the signal indicating that the passively actuated enabling element has been consumed;

initiate the gambling event based on the signal indicating that the passively actuated enabling element has been consumed;

transmit, to the real world engine, a signal including a request for a resolution of the gambling event;

receive, from the real world engine, a signal including a result of the gambling event based on a random number generator; and transmit, to the entertainment system engine, the signal including the result of the gambling event based on consumption of the passively actuated enabling element.

8. The electronic gaming machine of claim 7 wherein the game world controller is further constructed to automatically award an amount of a currency that may be used to change an entertainment game characteristic based on the result of the gambling event.

9. The electronic gaming machine of claim 7 wherein the game world controller is further constructed to automatically award an amount of a currency that may be used to change an entertainment game characteristic based on the result of the gambling event as well as the result of the consumption of the passively actuated enabling element in the entertainment game.

10. The electronic gaming machine of claim 7 wherein the game world controller is further constructed to:

provide the passively actuated enabling element that may be introduced into the entertainment game using a currency that may be used to change an entertainment game characteristic;

receive, from the entertainment system engine, the request from a player to introduce the passively actuated enabling element into the entertainment game;

deduct an amount of the currency required to introduce the passively actuated enabling element into the entertainment game from the amount of quanta available to the player; and transmit, to the entertainment system engine, the signal indicating an introduction of the passively actuated enabling element into the entertainment game.

11. The electronic gaming machine of claim 7, wherein the real world engine and the game world controller are constructed from different processing apparatuses, and wherein the game world controller and the real world engine are connected by a network.

12. The electronic gaming machine of claim 7, wherein the game world controller and the entertainment system engine are constructed from different processing apparatuses; and wherein the game world controller and the entertainment system engine are connected by a network.

13. An electronic gaming machine constructed to receive real world credits from a player, comprising:

a real world engine constructed to:

receive, from a game world controller, a signal including a request for a resolution of a gambling event;

generate a result of the gambling event using a random number generator for the gambling event;

transmit, to the game world controller, a signal including the result of the gambling event; and the game world controller, connected to an entertainment system engine with a visual output device and connected to the real world engine via a communication link, constructed to:

continuously monitor the entertainment system engine to determine if at least one passively actuated enabling element is available wherein the passively actuated enabling element is an enabling element that is consumed through game play of an entertainment game in a manner that is not directly responsive to a player action;

determine that a player account includes a sufficient amount of real world credit for a wager associated with the passively actuated enabling element when the passively actuated enabling element is introduced into the entertainment game;

automatically reserve the sufficient amount of real world credit in the player account for use on the wager when it is determined that the passively actuated enabling element is available;

continuously monitor the entertainment system engine for a signal indicating that the passively actuated enabling element has been consumed;

receive, from the entertainment system engine, the signal indicating the consumption of the passively actuated enabling element;

initiate the gambling event based on the signal indicating that the passively actuated enabling element has been consumed;

transmit, to the real world engine, the signal including the request for the resolution of the gambling event;

receive, from the real world engine, the signal including the result of the gambling event; and transmit, to the entertainment system engine, the signal including the result of the gambling event.

14. The electronic gaming machine of claim 13 wherein the game world controller is further constructed to automatically award an amount of a currency that may be used to change an entertainment game characteristic based on the result of the gambling event.

15. The electronic gaming machine of claim 13 wherein the game world controller is further constructed to automatically award an amount of a currency that may be used to change an entertainment game characteristic based on the result of the gambling event as well as the result of the consumption of the passively actuated enabling element in the entertainment game.

16. The electronic gaming machine of claim 13 wherein the game world controller is further constructed to:

provide the passively actuated enabling element that may be introduced into the entertainment game using a currency that may be used to change an entertainment game characteristic;

receive, from the entertainment system engine, the request from a player to introduce the passively actuated enabling element into the entertainment game;

deduct an amount of the currency required to introduce the passively actuated enabling element into the entertainment game from the amount of quanta available to the player; and transmit, to the entertainment system engine, the signal indicating an introduction of the passively actuated enabling element into the entertainment game.

17. The electronic gaming machine of claim 13, wherein the real world engine and the game world controller are constructed from different processing apparatuses, and wherein the game world controller and the real world engine are connected by a network.

18. The electronic gaming machine of claim 13, wherein the game world controller and the entertainment system engine are constructed from different processing apparatuses; and wherein the game world controller and the entertainment system engine are connected by a network.

* * * * *